(12) United States Patent
Lim et al.

(10) Patent No.: US 11,477,801 B2
(45) Date of Patent: Oct. 18, 2022

(54) DEVICE AND METHOD FOR FRONTHAUL TRANSMISSION IN WIRELESS COMMUNICATION SYSTEM

(71) Applicant: Samsung Electronics Co., Ltd., Suwon-si (KR)

(72) Inventors: Hyoungjin Lim, Suwon-si (KR); Jongho Oh, Suwon-si (KR); Wonjun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/085,269

(22) Filed: Oct. 30, 2020

(65) Prior Publication Data

US 2021/0136788 A1 May 6, 2021

(30) Foreign Application Priority Data

Oct. 30, 2019 (KR) .................. 10-2019-0137034

(51) Int. Cl.
*H04W 72/12* (2009.01)

(52) U.S. Cl.
CPC ... *H04W 72/1205* (2013.01); *H04W 72/1278* (2013.01)

(58) Field of Classification Search
None
See application file for complete search history.

(56) References Cited

U.S. PATENT DOCUMENTS

| 9,831,543 | B2 | 11/2017 | Choi et al. |
| 10,517,029 | B2 | 12/2019 | Kim et al. |

(Continued)

FOREIGN PATENT DOCUMENTS

| KR | 10-2015-0089893 A | 8/2015 |
| KR | 10-2015-0091938 A | 8/2015 |
| KR | 10-2021-0046486 A | 4/2021 |

OTHER PUBLICATIONS

Anil Umesh et al., 'Overview of O-RAN Fronthaul Specifications', Jul. 31, 2019 [retrieved on Feb. 1, 2021]. Retrieved from the Internet: <URL: https://www.nttdocomo.co.jp/english/binary/pdf/corporate/technology/rd/technical_journal/bn/vol21_1/vol21_1_007en.pdf> pp. 51-54.

(Continued)

*Primary Examiner* — Kodzovi Acolatse
(74) *Attorney, Agent, or Firm* — Jefferson IP Law, LLP

(57) ABSTRACT

A pre-$5^{th}$-Generation (5G) or 5G communication system for supporting higher data rates Beyond $4^{th}$-Generation (4G) communication system such as Long Term Evolution (LTE) is provided. The device of a radio unit (RU) of a base station in a wireless communication system includes at least one transceiver and at least one processor coupled to the at least one transceiver, wherein the at least one processor is configured to receive a first control message including a section extension field from a digital unit (DU) via a fronthaul interface, identify additional information based on the section extension field, and acquire a beamforming weight based on the additional information, wherein the first control message is configured to schedule a terminal in a control plane.

18 Claims, 17 Drawing Sheets

(56) References Cited

U.S. PATENT DOCUMENTS

| | | |
|---|---|---|
| 11,166,271 B2 | 11/2021 | Jeon et al. |
| 2016/0242147 A1 | 8/2016 | Tarlazzi et al. |
| 2017/0238361 A1 | 8/2017 | Pawar et al. |
| 2019/0132764 A1* | 5/2019 | Nam ................. H04W 28/0263 |
| 2019/0245740 A1 | 8/2019 | Kachhla |
| 2019/0289497 A1* | 9/2019 | Rajagopal ............. H04W 28/06 |
| 2019/0319742 A1 | 10/2019 | Wu et al. |
| 2020/0186188 A1* | 6/2020 | Li ........................ H04B 1/7156 |
| 2020/0351935 A1* | 11/2020 | Chapman .......... H04W 72/1289 |
| 2021/0105125 A1* | 4/2021 | Rajagopal ......... H04W 72/0413 |
| 2021/0126760 A1* | 4/2021 | Lee ....................... H04L 5/0005 |
| 2021/0135722 A1* | 5/2021 | Ahmed ................. H04W 72/04 |
| 2021/0243840 A1* | 8/2021 | Raghothaman ..... H04W 88/085 |

OTHER PUBLICATIONS

International Search Report dated Feb. 18, 2021, issued in International Application No. PCT/KR2020/015074.
O-RAN Fronthaul Working Group, "Control, User and Synchronization Plane Specification", ORAN-WG4.CUS.0-v02.00, Technical Specification, Aug. 2, 2019, pp. 1-218, XP009527536.
ITU-T, "5G wireless fronthaul requirements in a passive optical network context", Series G Supplement 66(Jul. 2019), Series G: Transmission Systems and Media, Digital Systems and Networks, International Telecommunication Union, Jul. 12, 2019, pp. 1-40, XP044301092.
Extended European Search Report dated Aug. 31, 2022, issued in European Patent Application No. 20880905.3.

* cited by examiner

| Section Type 6 : channel information conveyance | | | | | | | | # of bytes | | |
|---|---|---|---|---|---|---|---|---|---|---|
| 0 (msb) | 1 | 2 | 3 | 4 | 5 | 6 | 7 (lsb) | | | |
| Transport header ||||||||| 8 | Octet 1 |
| dataDirection | PayloadVersion ||| filterIndex |||| 1 | Octet 9 |
| frameId ||||||||| 1 | Octet 10 |
| subframeId |||| slotId ||||| 8 | Octet 11 |
| slotId ||| startSymbolId |||||| 8 | Octet 12 |
| numberOfsections ||||||||| 1 | Octet 13 |
| sectionType = 6 ||||||||| 1 | Octet 14 |
| numberOfUEs ||||||||| 1 | Octet 15 |
| reserved ||||||||| 1 | Octet 16 |
| ef || ueId[14:8] |||||||| 1 | Octet 17 |
| ueId[7:0] ||||||||| 1 | Octet 18 |
| regularizationFactor ||||||||| 2 | Octet 19 |
| reserved |||| rb || symInc | startPrbc | 1 | Octet 21 |
| startPrbc ||||||||| 1 | Octet 22 |
| numPrbc ||||||||| 1 | Octet 23 |
| ciIsample (first PRB, first antenna) ||||||||| var | Octet 24 |
| ciQsample (first PRB, first antenna) ||||||||| var | |
| ciIsample (first PRB, second antenna) ||||||||| var | |
| ciQsample (first PRB, second antenna) ||||||||| var | |
| ... ||||||||| | |
| ciIsample (first PRB, last antenna) ||||||||| var | |
| ciQsample (first PRB, last antenna) ||||||||| var | |
| ... ||||||||| | |
| ciIsample (last PRB, last antenna) ||||||||| var | |
| ciQsample (last PRB, last antenna) ||||||||| var | |
| section extensions as indicated by "ef" ||||||||| var | |
| ... ||||||||| | |
| ef || ueId[14:8] |||||||| 1 | Octet N |
| ueId[7:0] ||||||||| 1 | N+1 |
| regularizationFactor ||||||||| 2 | N+2 |
| reserved |||| rb || symInc | startPrbc | 1 | N+4 |
| startPrbc ||||||||| 1 | N+5 |
| numPrbc ||||||||| 1 | N+6 |
| ciIsample (first PRB, first antenna) ||||||||| var | N+7 |
| ciQsample (first PRB, first antenna) ||||||||| var | |
| ciIsample (first PRB, second antenna) ||||||||| var | |
| ciQsample (first PRB, second antenna) ||||||||| var | |
| ... ||||||||| | |
| ciIsample (first PRB, last antenna) ||||||||| var | |
| ciQsample (first PRB, last antenna) ||||||||| var | |
| ... ||||||||| | |
| ciIsample (last PRB, last antenna) ||||||||| var | |
| ciQsample (last PRB, last antenna) ||||||||| var | |
| section extensions as indicated by "ef" ||||||||| | |
| ||||||||| | Octet M |

501 {header rows}
503
505
507

FIG.5A

| 0 (msb) | 1 | 2 | 3 | 4 | 5 | 6 | 7(lsb) | # of bytes | |
|---|---|---|---|---|---|---|---|---|---|
| ef | exType = 0x11 | | | | | | | 1 | Octet M |
| extLen = 0x01 (1word) | | | | | | | | 1 | M+1 |
| regularizationFactor | | | | | | | | 2 | M+2 |

| Section Type 6 : channel information conveyance | | | | | | | | # of bytes | |
|---|---|---|---|---|---|---|---|---|---|
| 0 (msb) | 1 | 2 | 3 | 4 | 5 | 6 | 7 (lsb) | | |
| Transport header | | | | | | | | 8 | Octet 1 |
| dataDirection | | PayloadVersion | | | filterIndex | | | 1 | Octet 9 |
| frameId | | | | | | | | 1 | Octet 10 |
| subframeId | | | | slotId | | | | 8 | Octet 11 |
| slotId | | | startSymbolId | | | | | 8 | Octet 12 |
| numberOfsections | | | | | | | | 1 | Octet 13 |
| sectionType = 6 | | | | | | | | 1 | Octet 14 |
| numberOfUEs | | | | | | | | 1 | Octet 15 |
| reserved | | | | | | | | 1 | Octet 16 |
| ef | | ueId[14:8] | | | | | | 1 | Octet 17 |
| ueId[7:0] | | | | | | | | 1 | Octet 18 |
| regularizationFactor | | | | | | | | 2 | Octet 19 |
| reserved | | | | rb | symInc | startPrbc | | 1 | Octet 21 |
| startPrbc | | | | | | | | 1 | Octet 22 |
| numPrbc | | | | | | | | 1 | Octet 23 |
| ciIsample (first PRB, first antenna) | | | | | | | | var | Octet 24 |
| ciQsample (first PRB, first antenna) | | | | | | | | var | |
| ciIsample (first PRB, second antenna) | | | | | | | | var | |
| ciQsample (first PRB, second antenna) | | | | | | | | var | |
| ... | | | | | | | | | |
| ciIsample (first PRB, last antenna) | | | | | | | | var | |
| ciQsample (first PRB, last antenna) | | | | | | | | var | |
| ... | | | | | | | | | |
| ciIsample (last PRB, last antenna) | | | | | | | | var | |
| ciQsample (last PRB, last antenna) | | | | | | | | var | |
| section extensions as indicated by "ef" | | | | | | | | var | |
| ... | | | | | | | | | |

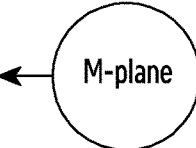 M-plane

FIG.7

DEVICE AND METHOD FOR FRONTHAUL TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0137034, filed on Oct. 30, 2019, in the Korean Intellectual Property Office, the disclosure of which is incorporated by reference herein in its entirety.

BACKGROUND

1. Field

The disclosure relates to a wireless communication system. More particularly, the disclosure relates to a device and method for fronthaul transmission in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As transmission capacity increases in a wireless communication system, a function split for functionally splitting a base station is applied. According to the function split, a base station may be split into a digital unit (DU) and a radio unit (RU), a fronthaul for communication between the DU and the RU is defined, and transmission via the fronthaul is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, as aspect of the disclosure is to provide a device and method for transmitting a control message on a fronthaul interface.

Another aspect of the disclosure is to provide a device and method for transmitting a management message on the fronthaul interface in the wireless communication system.

Another aspect of the disclosure is to provide a device and method for transferring scheduling information along with other information on the fronthaul interface in the wireless communication system.

Another aspect of the disclosure is to provide a device and method for transferring scheduling information along with, particularly, a regularization parameter on the fronthaul interface in the wireless communication system.

Another aspect of the disclosure is to provide a device and method for reducing a memory burden of a radio unit (RU) due to storage of a normalization parameter, when operating a digital unit (DU) and the RU in the wireless communication system.

Another aspect of the disclosure is to provide a functional structure of an RU for processing a normalization parameter in the wireless communication system.

Additional aspects will be set forth in part in the description which follows and, in part, will be apparent from the description, or may be learned by practice of the presented embodiments.

In accordance with an aspect of the disclosure, an operation method of a digital unit (DU) of a base station in a wireless communication system is provided. The operation method includes configuring a section extension field including additional information, and transmitting a first control message including the section extension field to a radio unit (RU) via a fronthaul interface, wherein the first control message is configured to schedule a terminal in a control plane.

In accordance with another aspect of the disclosure, an operation method of a radio unit (RU) of a base station in a wireless communication system is provided. The operation method includes receiving a first control message including a section extension field from a digital unit (DU) via a fronthaul interface, identifying additional information based on the section extension field, and acquiring a beamforming weight based on the additional information, wherein the first control message is configured to schedule a terminal in a control plane.

In accordance with another aspect of the disclosure, a device of a digital unit (DU) of a base station in a wireless communication system is provided. The device includes at least one transceiver and at least one processor coupled to the at least one transceiver, wherein the at least one processor is configured to configure a section extension field including additional information, and transmit a first control message including the section extension field to a radio unit (RU) via a fronthaul interface, wherein the first control message is configured to schedule a terminal in a control plane.

In accordance with another aspect of the disclosure, a device of a radio unit (RU) of a base station in a wireless communication system is provided. The device includes at least one transceiver and at least one processor coupled to the at least one transceiver, wherein the at least one processor is configured to receive a first control message including a section extension field from a digital unit (DU) via a fronthaul interface, identify additional information based on the section extension field, and acquire a beamforming weight based on the additional information, wherein the first control message is configured to schedule a terminal in a control plane.

A device and method according to various embodiments enables efficient operations of interfaces of a digital unit (DU) and a radio unit (RU) via a control message and a management message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A illustrates an example of a control message according to section type 6 according to an embodiment of the disclosure;

FIG. 6 illustrates an example of an extension field according to an embodiment of the disclosure;

FIG. 7 illustrates an example of a management message for section type 6 according to an embodiment of the disclosure;

Throughout the drawings, like reference numerals will be understood to refer to like parts, components, and structures.

DETAILED DESCRIPTION

Figure 1A:
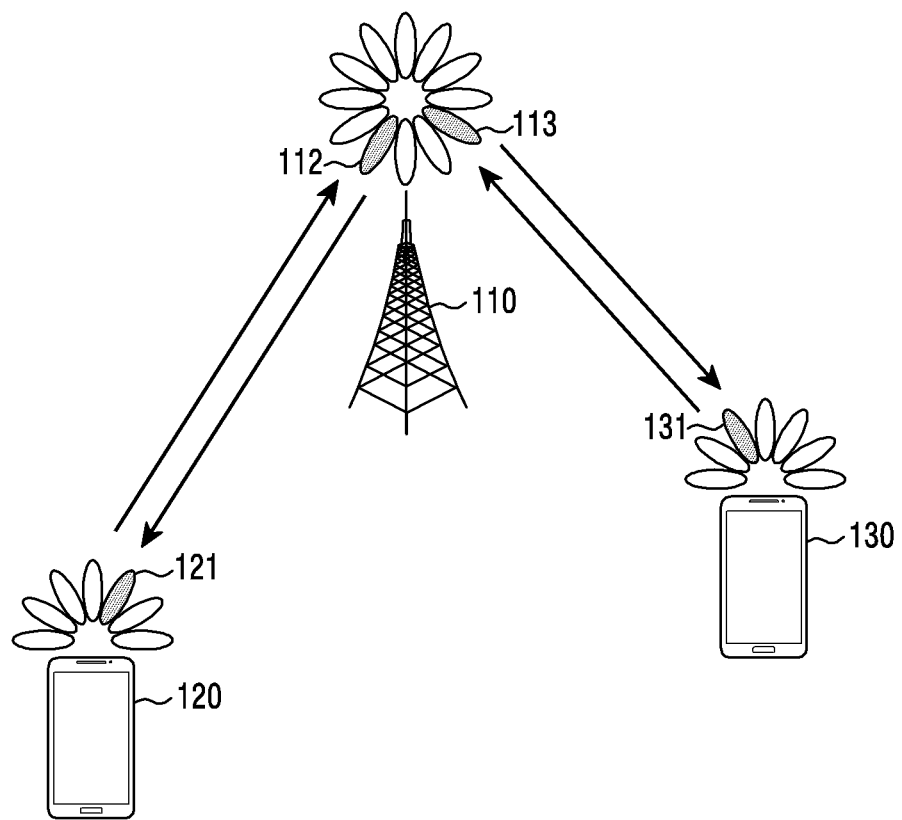
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms (e.g., message, information, preamble, signal, signaling, sequence, and stream) referring to a signal, terms (e.g., symbol, slot, subframe, radio frame, subcarrier, resource element (RE), resource block (RB), bandwidth part (BWP), and occasion) referring to a resource, terms (e.g., operation, and procedure) referring to an operation state, terms (e.g., user stream, intelligence quotient (IQ) data, information, bit, symbol, and codeword) referring to data, terms referring to a channel, terms (e.g., downlink control information (DCI), medium access control (MAC) control element (CE), and radio resource control (RRC) signaling) referring to control information, terms referring to network entities, terms referring to elements of a device, etc. are illustrated for the convenience of description. Therefore, the disclosure is not limited to the terms described below, and other terms having equivalent technical meanings may be used.

In the disclosure, in order to determine whether a specific condition is satisfied or fulfilled, an expression of more/greater/larger than or less/smaller than may be used, but this is only a description for expressing an example, and does not exclude a description of equal to or more/greater/larger than or a description of equal to or less/smaller than. The condition described as "equal to or more/greater/larger than"

may be replaced with "more/greater/larger than", the condition described as "equal to or less/smaller than" may be replaced with "less/smaller than", and the condition described as "equal to or more/greater/larger than, and less/smaller than" may be replaced with "more/greater/larger than, and equal to or less/smaller than".

In the disclosure, various embodiments are described using terms used in some communication standards (e.g., 3rd generation partnership project (3GPP), extensible radio access network (xRAN), and open-radio access network (O-RAN)), but these are merely examples for description. Various embodiments of the disclosure may also be easily modified and applied to other communication systems.

FIG. 1A illustrates a wireless communication system according to an embodiment of the disclosure.

Referring to FIG. 1A, it illustrates a base station 110, a terminal 120, and a terminal 130, as parts of nodes using a radio channel in a wireless communication system. FIG. 1A illustrates only one base station, but may further include another base station that is the same as or similar to the base station 110.

The base station 110 is a network infrastructure that provides wireless access to the terminals 120 and 130. The base station 110 has coverage defined to be a predetermined geographic area based on the distance over which a signal may be transmitted. The base station 110 may be referred to as, in addition to "base station", "access point (AP)", "eNodeB (eNB)", "5G node (5th generation node)", "next generation nodeB (gNB)", "wireless point", "transmission/reception point (TRP)", or other terms having equivalent technical meanings.

Each of the terminal 120 and the terminal 130 is a device used by a user, and performs communication with the base station 110 via the radio channel. A link from the base station 110 to the terminal 120 or the terminal 130 is referred to as a downlink (DL), and a link from the terminal 120 or the terminal 130 to the base station 110 is referred to as an uplink (UL). The terminal 120 and the terminal 130 may communicate with each other via a radio channel. In this case, a device-to-device (D2D) link between the terminal 120 and the terminal 130 is referred to as a sidelink, and the sidelink may be interchangeably used with a PC5 interface. In some cases, at least one of the terminal 120 and the terminal 130 may be operated without involvement of a user. That is, at least one of the terminal 120 and the terminal 130 is a device that performs machine type communication (MTC) and may not be carried by a user. Each of the terminal 120 and the terminal 130 may be referred to as, in addition to "terminal", "user equipment (UE)", "customer premises equipment (CPE)", "mobile station", "subscriber station", "remote terminal", "wireless terminal", "electronic device", "user device", or other terms having equivalent technical meanings.

The base station 110, the terminal 120, and the terminal 130 may perform beamforming. The base station 110, the terminal 120, and the terminal 130 may transmit and receive radio signals in a relatively low frequency band (e.g., frequency range 1 (FR1) of new radio (NR)) as well as a high frequency band (e.g., FR2 of NR, and a millimeter wave (mmWave) band (e.g., 28 GHz, 30 GHz, 38 GHz, and 60 GHz)). In some embodiments, the base station may perform communication with the terminal within a frequency range corresponding to FR1. In some embodiments, the base station may perform communication with the terminal within a frequency range corresponding to FR2. At this time, in order to improve a channel gain, the base station 110, the terminal 120, and the terminal 130 may perform beamforming. The beamforming may include transmission beamforming and reception beamforming. That is, the base station 110, the terminal 120, and the terminal 130 may assign a directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, communication may then be performed via resources that are in quasi co-located (QCL) relationship with resources at which the serving beams 112, 113, 121, and 131 are transmitted.

If large-scale characteristics of a channel, via which a symbol on a first antenna port has been transferred, can be inferred from a channel via which a symbol on a second antenna port has been transferred, it may be estimated that the first antenna port and the second antenna port are in a QCL relationship. For example, the large-scale characteristics may include at least one among a delay spread, a Doppler spread, a Doppler shift, an average gain, an average delay, and a spatial receiver parameter.

Referring to FIG. 1A, it is illustrated that both the base station and the terminal perform beamforming, but various embodiments are not necessarily limited thereto. In some embodiments, the terminal may or may not perform beamforming. The base station may or may not perform beamforming. That is, only one of the base station and the terminal may perform beamforming, or neither the base station nor the terminal may perform beamforming.

In the disclosure, a beam refers to a spatial flow of a signal in a radio channel, and is formed by one or more antennas (or antenna elements), and this forming procedure may be referred to as beamforming. Beamforming may include analog beamforming and digital beamforming (e.g., precoding). A reference signal transmitted based on beamforming may be, for example, a demodulation-reference signal (DM-RS), a channel state information-reference signal (CSI-RS), a synchronization signal/physical broadcast channel (SS/PBCH), and a sounding reference signal (SRS). As a configuration for each reference signal, an internet explorer (IE), such as a CSI-RS resource or an SRS-resource, may be used, and this configuration may include information associated with a beam. The information associated with a beam may indicate whether the configuration (e.g., CSI-RS resource) uses the same spatial domain filter as that of the other configuration (e.g., another CSI-RS resource in the same CSI-RS resource set) or uses a different spatial domain filter, or may indicate a reference signal, with which the configuration is quasi-co-located (QCL), and a type (e.g., QCL type A, B, C, D) of the QCL if the configuration is quasi-co-located.

Referring to FIG. 1A, it is illustrated that both the base station and the terminal perform beamforming, but various embodiments are not necessarily limited thereto. In some embodiments, the terminal may or may not perform beamforming. The base station may or may not perform beamforming. That is, only one of the base station and the terminal may perform beamforming, or neither the base station nor the terminal may perform beamforming.

In a communication system of the related art in which a cell radius of a base station is relatively large, each base station is installed so that each base station includes a function of a digital processing unit (or DU) and a function of a radio frequency (RF) processing unit (or RU). However, when a high frequency band is used in a communication system of 4th generation (4G) and/or later, and as the cell radius of a base station decreases, the number of base stations for covering a specific area has increased, and the burden of installation costs of the operator for installation of the increased number of base stations has increased. In order to minimize an installation cost of a base station, a structure has been proposed, the structure in which a DU and RUs of the base station are separated so that one or more RUs are connected to one DU via a wired network, and one or more RUs distributed geographically are deployed to cover a specific area. Hereinafter, deployment structure and extension examples of the base station according to various embodiments will be described via FIG. 1B.

Figure 1B:
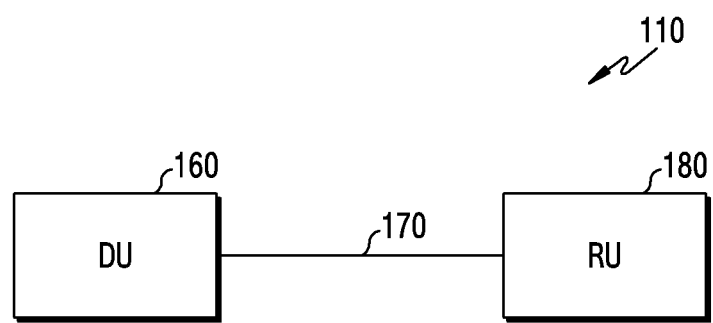
FIG. 1B illustrates an example of a fronthaul structure according to a function split of the base station according to an embodiment of the disclosure.

FIG. 1B illustrates an example of a fronthaul structure according to a function split of the base station according to an embodiment of the disclosure. Unlike a backhaul between a base station and a core network, a fronthaul is located between entities between a WLAN and a base station.

Referring to FIG. 1B, the base station 110 may include a DU 160 and an RU 180. A fronthaul 170 between the DU 160 and the RU 180 may be operated via an Fx interface. For the operation of the fronthaul 170, for example, an interface, such as an enhanced common public radio interface (eCPRI) and radio over Ethernet (ROE), may be used.

With the development of communication technology, mobile data traffic increases, and accordingly, the amount of bandwidth required in a fronthaul between a digital unit and a radio unit has greatly increased. In an arrangement, such as a centralized/cloud radio access network (C-RAN), the DU may be implemented to perform functions for a packet data convergence protocol (PDCP), a radio link control (RLC), a media access control (MAC), and a physical (PHY) layer, and the RU may be implemented to perform more functions for a PHY layer in addition to a radio frequency (RF) function.

The DU 160 may be in charge of an upper layer function of a radio network. For example, the DU 160 may perform a function of a MAC layer and a part of a PHY layer. Here, a part of the PHY layer is a function performed at a higher stage from among functions of the PHY layer, and may include, for example, channel encoding (or channel decoding), scrambling (or descrambling), modulation (or demodulation), and layer mapping (or layer demapping). According to an embodiment, if the DU 160 conforms to the O-RAN standard, it may be referred to as an O-RAN DU (O-DU). The DU 160 may be replaced with and represented by a first network entity for the base station (e.g., gNB) in embodiments of the disclosure as needed.

The RU 180 may be in charge of a lower layer function of the radio network. For example, the RU 180 may perform a part of the PHY layer and the RF function. Here, a part of the PHY layer is a function performed at a relatively lower stage compared to the DU 160 from among the functions of the PHY layer, and may include, for example, an inverse fast Fourier transform (IFFT) transformation (or FFT transformation), cyclic prefix (CP) insertion (CP removal), and digital beamforming. An example of such a specific function split is described in detail in FIG. 4. The RU 180 may be referred to as "access unit (AU)", "access point (AP)", "transmission/reception point (TRP)", "remote radio head (RRH)", "radio unit (RU)" or another term having an equivalent technical meaning. According to an embodiment, if the RU 180 conforms to the O-RAN standard, it may be referred to as an O-RAN RU (O-RU). The DU 180 may be replaced with and represented by a second network entity for the base station (e.g., gNB) in embodiments of the disclosure as needed.

FIG. 1B shows that the base station includes the DU and the RU, but various embodiments are not limited thereto. In some embodiments, the base station may be implemented to have distributed deployment according to a centralized unit (CU) configured to perform a function of an upper layer (e.g., packet data convergence protocol (PDCP) and RRC) of an access network and a distributed unit (DU) configured to perform a function of a lower layer. The distributed unit (DU) may include the digital unit (DU) and the radio unit (RU) of FIG. 1B. Between the core (e.g., 5G core (5GC) or next generation core (NGC)) network and the radio network (RAN), the base station may be implemented in a structure with deployment in the order of the CU, the DU, and the RU. An interface between the CU and the distributed unit (DU) may be referred to as an F1 interface.

The centralized unit (CU) may be connected to one or more DUs so as to be in charge of a function of a layer higher than that of the DUs. For example, the CU may be in charge of functions of radio resource control (RRC) and packet data convergence protocol (PDCP) layers, and the DU and the RU may be in charge of a function of a lower layer. The DU may perform some functions of the physical (PHY) layer, the media access control (MAC), and the radio link control (RLC), and the RU may be in charge of the remaining functions (low PHY) of the PHY layer. For example, the digital unit (DU) may be included in a distributed unit (DU) according to distributed deployment implementation of the base station. Hereinafter, unless otherwise defined, descriptions are provided with operations of a digital unit (DU) and a RU. However, various embodiments may be applied to base station deployment including a CU and/or deployment in which a DU is directly connected to a core network without a CU (i.e., a CU and a DU are integrated and implemented into one entity).

Figure 2:
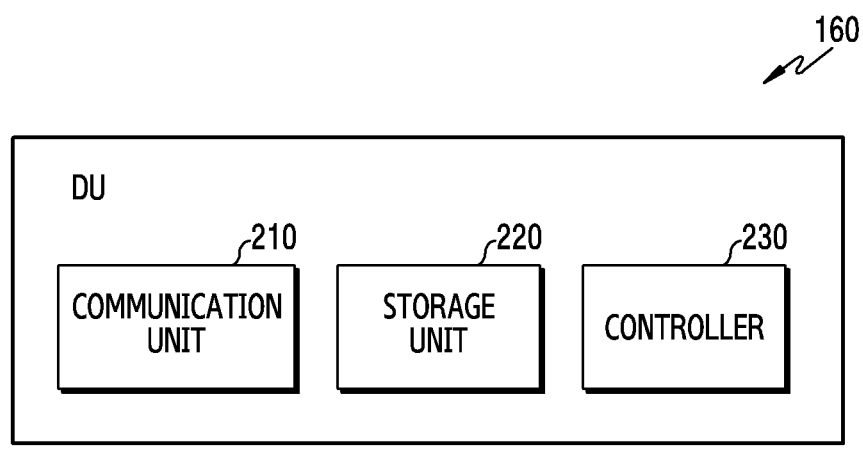
FIG. 2 illustrates a configuration of a digital unit (DU) according to an embodiment of the disclosure.

FIG. 2 illustrates a configuration of a DU in the wireless communication system according to an embodiment of the disclosure. The configuration illustrated in FIG. 2 may be understood as the configuration of the DU 160 of FIG. 1B, as part of the base station. The terms "-unit", "-device", etc. used hereinafter refer to a unit that processes at least one function or operation, which may be implemented by hardware or software, or a combination of hardware and software.

Referring to FIG. 2, the DU 160 includes a communication unit 210, a storage unit 220, and a controller 230.

The communication unit 210 may perform functions for transmitting or receiving a signal in a wired communication environment. The communication unit 210 may include a wired interface for controlling a direct connection between devices via a transmission medium (e.g., copper wire and optical fiber). For example, the communication unit 210 may transfer an electrical signal to another device through a copper wire, or may perform conversion between an electrical signal and an optical signal. The communication unit 210 may be connected to the radio unit (RU). The communication unit 210 may be connected to the core network or may be connected to the CU in distributed deployment.

The communication unit 210 may perform functions for transmitting or receiving a signal in a wired communication environment. For example, the communication unit 210 may perform conversion between a baseband signal and a bit stream according to the physical layer specification of a system. For example, when transmitting data, the communication unit 210 generates complex symbols by encoding and modulating a transmission bit stream. When receiving data, the communication unit 210 reconstructs a received bit stream by demodulating and decoding the baseband signal.

Also, the communication unit 210 may include a plurality of transmission/reception paths. According to an embodiment, the communication unit 210 may be connected to the core network or may be connected to other nodes (e.g., integrated access backhaul (IAB)).

The communication unit 210 may transmit or receive a signal. To this end, the communication unit 210 may include at least one transceiver. For example, the communication unit 210 may transmit a synchronization signal, a reference signal, system information, a message, a control message, a stream, control information, data, or the like. The communication unit 210 may perform beamforming.

The communication unit 210 transmits and receives a signal as described above. Accordingly, all or a part of the communication unit 210 may be referred to as "transmitter", "receiver", or "transceiver". In the following description, transmission and reception performed via a radio channel are used in a sense including processing performed as described above by the communication unit 210.

Although not illustrated in FIG. 2, the communication unit 210 may further include a backhaul communication unit for connecting to the core network or another base station. The backhaul communication unit provides an interface to perform communication with other nodes within the network. That is, the backhaul communication unit converts, into a physical signal, a bit stream transmitted from the base station to another node, for example, another access node, another base station, an upper node, the core network, etc., and converts a physical signal received from another node into a bit stream.

The storage unit 220 stores data, such as a basic program, an application program, and configuration information for operations of the DU 160. The storage unit 220 may include a memory. The storage unit 220 may include a volatile memory, a nonvolatile memory, or a combination of a volatile memory and a nonvolatile memory. The storage unit 220 provides stored data in response to a request of the controller 230.

The controller 230 may control overall operations of the DU 160. For example, the controller 230 transmits and receives a signal via the communication unit 210 (or backhaul communication unit). Further, the controller 230 records and reads data in the storage unit 220. The controller 230 may perform functions of a protocol stack required by the communication standard. To this end, the controller 230 may include at least one processor. In some embodiments, the controller 230 may include a control message generator that generates a control plane message having an extension field including a regularization factor, and a management message generator that generates a management message for deactivating a regularization factor field of a message (e.g., a control plane message of section Type 6 of O-RAN) including an existing regularization factor. The control message generator and the management message generator are instruction sets/codes stored in the storage unit 220, and may be instructions/codes which at least temporarily reside in the controller 240, or storage spaces that store the instructions/codes, or may be a part of a circuitry constituting the controller 240. According to various embodiments, the controller 230 may control the DU 160 to perform operations based on the various embodiments described below.

The configuration of the DU 160 illustrated in FIG. 2 is merely an example, and an example of the DU performing various embodiments of the disclosure is not limited from the configuration illustrated in FIG. 2. That is, according to various embodiments, some elements may be added, deleted, or changed.

Figure 3:
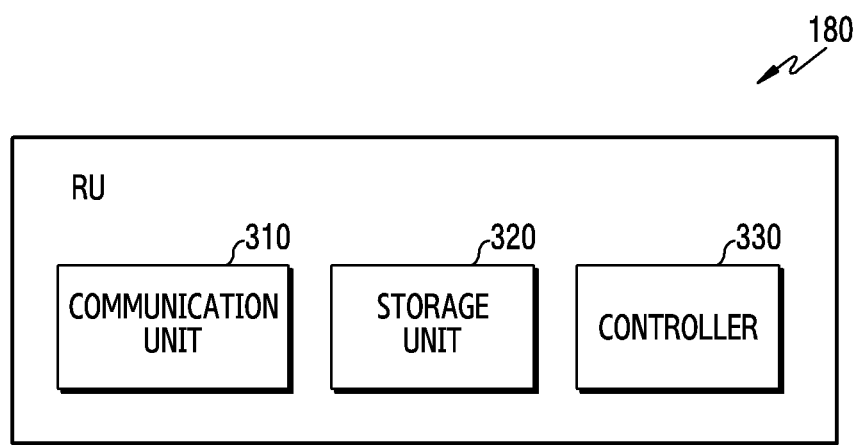
FIG. 3 illustrates a configuration of a radio unit (RU) according to an embodiment of the disclosure.

FIG. 3 illustrates a configuration of an RU in the wireless communication system according to an embodiment of the disclosure. The configuration illustrated in FIG. 3 may be understood as the configuration of the RU 180 of FIG. 1B, as part of the base station. The terms "-unit", "-device", etc. used hereinafter refer to a unit that processes at least one function or operation, which may be implemented by hardware or software, or a combination of hardware and software.

Referring to FIG. 3, the RU 180 includes a communication unit 310, a storage unit 320, and a controller 330.

The communication unit 310 performs functions for transmitting or receiving a signal via a radio channel. For example, the communication unit 310 up-converts a baseband signal into an RF band signal, transmits the up-converted RF band signal via an antenna, and then down-converts the RF band signal received via the antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include an antenna unit. The communication unit 310 may include at least one antenna array including multiple antenna elements. In terms of hardware, the communication unit 310 may include a digital circuit and an analog circuit (e.g., radio frequency integrated circuit (RFIC)). The digital circuit and the analog circuit may be implemented in a single package. The communication unit 310 may include a plurality of RF chains. The communication unit 310 may perform beamforming. In order to give directivity according to a configuration of the controller 330 to a signal to be transmitted or received, the communication unit 310 may apply a beamforming weight to the signal. According to an embodiment, the communication unit 310 may include a radio frequency (RF) block (or RF unit).

The communication unit 310 may transmit or receive a signal. To this end, the communication unit 310 may include at least one transceiver. The communication unit 310 may transmit a downlink signal. The downlink signal may include a synchronization signal (SS), a reference signal (RS) (e.g., cell-specific reference signal (CRS) and a demodulation (DM)-RS), system information (e.g., master information block (MIB), system information block (SIB), remaining system information (RMSI), and other system information (OSI)), a configuration message, control information, downlink data, or the like. The communication unit 310 may receive an uplink signal. The uplink signal may include a random access-related signal (e.g., a random access preamble (RAP) (or message 1 (Msg1)) and message 3 (Msg3)) or a reference signal (e.g., a sounding reference signal (SRS), and a DM-RS), a power headroom report (PHR), or the like.

The communication unit 310 transmits and receives a signal as described above. Accordingly, all or a part of the communication unit 310 may be referred to as "transmitter", "receiver", or "transceiver". In the following description, transmission and reception performed via a wireless channel are used in a sense including processing performed as described above by the wireless communication unit 310.

The storage unit 320 stores data, such as a basic program, an application program, and configuration information for operations of the RU 180. The storage unit 320 may include a volatile memory, a nonvolatile memory, or a combination of a volatile memory and a nonvolatile memory. The storage unit 320 provides stored data in response to a request of the controller 330. According to an embodiment, the storage unit 320 may include a channel memory for updating channel information, without a memory that stores separate regularization parameter-related information in real time.

The controller 330 controls overall operations of the RU 180. For example, the controller 330 transmits and receives a signal via the communication unit 310. The controller 330 records and reads data in the storage unit 320. The controller 330 may perform functions of a protocol stack required by the communication standard. To this end, the controller 330 may include at least one processor. In some embodiments, the controller 330 may include a control message interpreter that interprets a message of a control plane (C-plane) having an extension field including a regularization factor, and a management message interpreter that interprets a message of a management plane (M-plane) to deactivate a regularization factor field of a message (e.g., a control plane message of section Type 6 of O-RAN) including an existing regularization factor. The control message interpreter and a management message interpreter, which are instruction sets or codes stored in the storage unit 320, may be instructions/codes that are at least temporarily residing in the controller 330, or storage spaces that store the instructions/codes, or may be a part of a circuitry constituting the controller 330. The controller 330 may include various modules for performing communication. According to various embodiments, the controller 330 may control a terminal to perform operations based on various embodiments described below.

Figure 4:
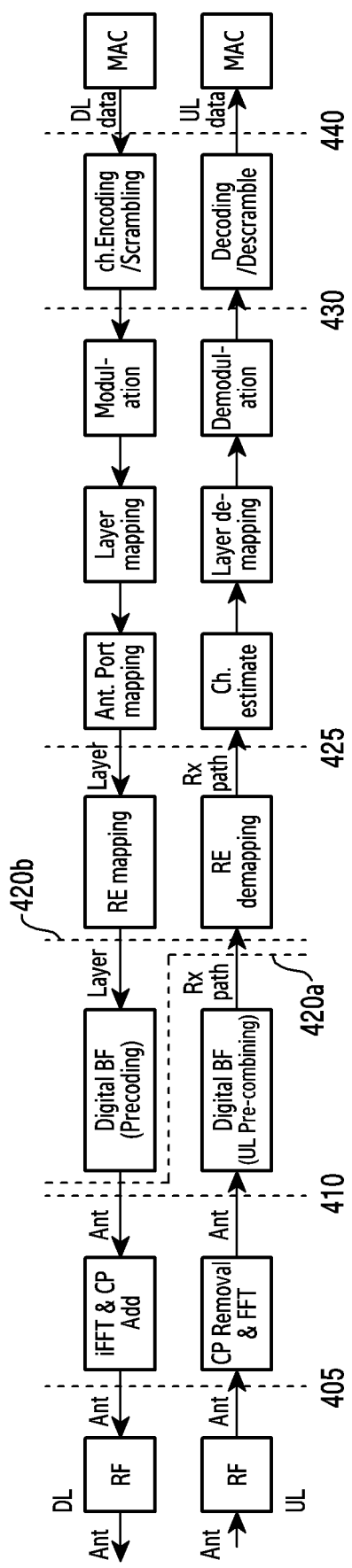
FIG. 4 illustrates an example of a function split according to an embodiment of the disclosure.

FIG. 4 illustrates an example of a function split in the wireless communication system according to an embodiment of the disclosure. With the advancement of wireless communication technology (e.g., $5^{th}$ generation communication system (or the introduction of new radio (NR) communication system)), a use frequency band has increased more and more, and as a cell radius of a base station becomes very small, the number of RUs required to be installed has further increased. In a 5G communication system, the amount of transmitted data has increased by 10 times or more at most, and the transmission capacity of a wired network, which is transmitted via a fronthaul, has increased significantly. Due to these factors, the installation cost of a wired network in a 5G communication system may increase significantly. Therefore, in order to lower the transmission capacity of the wired network and reduce the installation cost of the wired network, techniques for lowering the transmission capacity of the fronthaul by transferring some functions of a modem of a DU to a RU have been proposed, and these techniques may be referred to as "function split".

In order to reduce the burden on the DU, a method of extending a role of the RU, which is in charge of only an RF function, to some functions of a physical layer is considered. In this case, as the RU performs functions of a higher layer, the throughput of the RU increases, so that a transmission bandwidth in the fronthaul may increase, while delay time requirement constraint due to response processing decreases. As the RU performs the functions of a higher layer, the virtualization gain decreases and the size/weight/cost of the RU increases. In consideration of the trade-off of the advantages and disadvantages described above, it is required to implement an optimal function split.

Referring to FIG. 4, function splits in a physical layer below a MAC layer are shown. In the case of a downlink (DL) that transmits a signal to a terminal via the radio network, the base station may sequentially perform channel encoding/scrambling, modulation, layer mapping, antenna mapping, RE mapping, digital beamforming (e.g., precoding), IFFT transform/CP insertion, and RF conversion. In the case of an uplink (UL) that receives a signal from a terminal via the radio network, the base station may sequentially perform RF conversion, FFT transform/CP removal, digital beamforming (pre-combining), RE demapping, channel estimation, layer demapping, demodulation, and decoding/descrambling. Separation of uplink functions and downlink functions may be defined in various types by the necessity between vendors, discussion on specifications, etc. according to the trade-off described above.

A first function split 405 may be separation of an RF function and a PHY function. The first function split is that the PHY function in the RU is not substantially implemented, and may be referred to as, for example, option 8. A second function split 410 enables the RU to perform the PHY function that is to perform IFFT transform/CP insertion in the DL and FFT transform/CP removal in the UL, and enables the DU to perform the remaining PHY functions. For example, the second function split 410 may be referred to as option 7-1. A third function split 420a enables the RU to perform the PHY function that is to perform IFFT transform/CP insertion in the DL and FFT transform/CP removal and digital beamforming in the UL, and enables the DU to perform the remaining PHY functions. For example, the third function split 420a may be referred to as option 7-2× category A. A fourth function split 420b enables the RU to perform up to digital beamforming in both the DL and UL, and enables the DU to perform higher PHY functions after the digital beamforming. For example, the fourth function split 420b may be referred to as option 7-2× category B. A fifth function split 425 enables the RU to perform up to RE mapping (or RE demapping) in both the DL and UL, and enables the DU to perform higher PHY functions after the RE mapping (or RE demapping). For example, the fifth function split 425 may be referred to as option 7-2. A sixth function split 430 enables the RU to perform up to modulation (or demodulation) in both the DL and UL, and enables the DU to perform higher PHY functions after the modulation (or demodulation). For example, the sixth function split 430 may be referred to as option 7-3. A seventh function split 440 enables the RU to perform up to encoding/scrambling (or decoding/descrambling) in both the DL and UL, and enables the DU to perform higher PHY functions after the encoding/scrambling (or decoding/descrambling). For example, the seventh function split 440 may be referred to as option 6.

According to an embodiment, when large-capacity signal processing is expected, such as the FR1 MMU, a function split (e.g., the fourth function split 420b) at a relatively high layer may be required to reduce a fronthaul capacity. In a function split (e.g., the sixth function split 430) at a layer that is too high, a control interface becomes complex, and the burden on the implementation of the RU may be caused due to a plurality of PHY processing blocks included in the RU, so that an appropriate function split may be required according to a deployment and implementation scheme for the DU and the RU.

According to an embodiment, if precoding of data received from the DU is unable to be processed (i.e., if there is a limit to the precoding capability of the RU), the third function split 420a or a lower function split (e.g., the second function split 410) may be applied. Conversely, if there is an ability to process the precoding of data received from the DU, the fourth function split 420b or a higher function split (e.g., the sixth function split 430) may be applied. Hereinafter, various embodiments are described based on the third function split 420a or fourth function split 420b for performing beamforming processing by the RU unless otherwise limited, but configurations of the embodiments via other function splits are not excluded. The control plane message, management plane message, or configuration/operation flows of other devices in FIG. 5A to FIG. 11, which are described later may be applied to not only the third function split 420a or the fourth function split 420b but also other function splits.

In various embodiments, when a message is transmitted between a DU (e.g., the DU 160 in FIG. 1B) and an RU (e.g., the RU 180 in FIG. 1B), an eCPRI and an O-RAN standards are exemplary as fronthaul interfaces. An eCPRI header, an O-RAN header, and an additional field may be included in an Ethernet payload of a message. Hereinafter, various embodiments will be described using standard terms of the eCPRI or O-RAN, but other expressions having the equivalent meaning as each term may be substituted and used in the various embodiments.

For a fronthaul transport protocol, Ethernet and eCPRI, which enable easy sharing with a network, may be used. The eCPRI header and the O-RAN header may be included in the Ethernet payload. The eCPRI header may be located at the front end of the Ethernet payload. The contents of the eCPRI header are as follows.

ecpriVersion (4 bits): 0001b (fixed value)
ecpriReserved (3 bits): 0000b (fixed value)
ecpriConcatenation (1 bit): 0b (fixed value)
ecpriMessage (1 byte): Message type
ecpriPayload (2 bytes): Payload size in bytes
ecpriRtcid/ecpriPcid (2 bytes): x, y, and z may be configured via a management plane (M-plane). A corresponding field may indicate a transmission path (extended antenna-carrier (eAxC) in the eCPRI) of a control message according to various embodiments during multi-layer transmission.
CU_Port_ID (x bits): A channel card is classified. Classification is possible including up to a modem (2 bits for channel card, and 2 bits for Modem).
BandSector_ID (y bits): Classification is performed according to cell/sector.
CC_ID (z bits): Classification is performed according to a component carrier.
RU_Port_ID (w bits): Classification is performed according to layer, T, antenna, etc.
ecpriSeqid (2 bytes): A sequence identification (ID) is managed for each ecpriRtcid/ecpriPcid, and a sequence ID and a subsequence ID are separately managed. Radio-transport-level fragmentation is possible if a subsequence ID is used (different from application-level fragmentation).

An application protocol of the fronthaul may include a control plane (C-plane), a user plane (U-plane), a synchronization plane (S-plane), and a management plane (M-plane).

The control plane may be configured to provide the scheduling information and the beamforming information via the control message. The user plane may include user downlink data (IQ data or SSB/RS), uplink data (IQ data or SRS/RS), or PRACH data. A weight vector of the above-described beamforming information may be multiplied by user data. The synchronization plane may be related to timing and synchronization. The management plane may be related to an initial setup, a non-realtime reset or reset, and a non-realtime report.

To define a type of a message transmitted in the control plane, a section type is defined. The section type may indicate the purpose of a control message transmitted in the control plane. For example, the use of each section type is as follows.

sectionType=0: DL idle/guard periods—Tx blanking for power saving purposes
sectionType=1: mapping a BF index or weight (O-RAN mandatory BF scheme) to an RE of a DL/UL channel
sectionType=2: reserved
sectionType=3: mapping a beamforming index or weight to an RE of a mixed-numerology channel and PRACH
sectionType=4: reserved
sectionType=5: transferring UE scheduling information so as to enable an RU to calculate a real-time BF weight (O-RAN optional BF scheme)
sectionType=6: periodically transferring UE channel information so as to enable an RU to calculate a real-time BF weight (O-RAN optional BF scheme)
sectionType=7: used for LAA support When the RU communicates with a UE via beamforming, the RU requires information on a current channel and scheduling information. That is, the RU is required to acquire a control message of section type 5 and a control message of section type 6. The RU may identify, from the control message of section type 5, whether the UE is scheduled for each slot, and may identify information on a current channel state from the control message of section type 6. The control message of section type 6 may be transferred periodically. Channel information may be transferred periodically so as to enable the RU to calculate a beamforming weight for each slot. Hereinafter, an example of a control message according to section type 6 is described with reference to FIG. 5A.

FIG. 5A illustrates an example of a control message according to section type 6 according to an embodiment of the disclosure. The control message according to section type 6 is configured for the purpose of carrying channel information.

Referring to FIG. 5A, the control message of section type 6 may include a transport header 501, a common header 503, first section information 505, and second section information 507. The transport header 501 may include a header according to an eCPRI or IEEE.

The common header 503 is a common radio application header, and may include parameters as follows.
dataDirection (data direction (gNB Tx/Rx)) field: 1 bit
payloadVersion (payload version) field: 3 bits
value="1" shall be set (1 st protocol version for payload and time reference format)
filterIndex (filter index) field: 4 bits,
frameId (frame identifier) field: 8 bits
subframeId (subframe identifier) field: 4 bits
slotID (slot identifier) field: 6 bits
startSymbolid (start symbol identifier) field: 6 bits
numberOfsections (number of sections) field: 8 bits
sectionType (section type) field: 8 bits, value=6
numberOfUEs (number of UE-specific channel information data sets) field: 8 bits
reserved (reserved for future use) field: 8 bits The first section information 505 and the second section information 507 may be configured for each UE. For example, the first section information 505 may be configured for a first UE, and the second section information may be configured for a second UE. Hereinafter, although descriptions are provided based on the first section information 505, the same or similar format may be also applied to the second section information 507. The first section information 505 may include parameters as follows.
of (extension flag) field: 1 bit
ueId (UE identifier) field: 15 bits regularizationFactor (regularization factor used for MMSE reception) field: 16 bits reserved (reserved for future use) field: 4 bits
  rb (resource block identifier) field: 1 bit
  symInc (symbol number increment command) field: 1 bit
  startPrbc (starting PRB of data section description) field: 10 bits
  numPrbc (number of contiguous PRBs per data section description) field: 8 bits
  ciIsample (channel information value, in-phase sample) field: 16 bits
  ciQsample (channel information value, quadrature sample) field: 16 bits Here, "regularizationFactor" is a parameter defined in the control message of section type 6, and is transferred periodically. The "regularizationFactor" may provide a signaled value for support of a minimum mean square error (MMSE) operation by the RU, a DL/UL (e.g., the fourth function split of FIG. 4) of option 7-2x category B, or a UL when a beamforming weight is supported by the RU (e.g., option 7-2x category A (e.g., the third function split 420a of FIG. 4)). The "regularizationFactor" is 2 bytes (i.e., 16 bits), and indicates the value.

According to various embodiments, a regularization parameter indicated by "regularizationFactor" may be used to derive a beamforming weight. For example, the relationship between the regularization parameter and the beamforming weight may be derived based on the following equation.

$$G = \frac{1}{\sqrt{\Psi}} (H^H H + \xi I_M)^{-1} H^H \qquad \text{Equation 1}$$

Here, G denotes a beamforming weight matrix, $\Psi$ denotes a power normalized parameter for limiting full power, and $\xi$ denotes a regularization parameter. H denotes a channel matrix. In addition to Equation 1, a plurality of methods may be used to calculate a beamforming weight. That is, various embodiments are not limited to calculation of a beamforming weight from a regularization parameter by using the method of Equation 1.

For example, a beamforming weight may be derived based on a channel covariance parameter, and the relationship between the channel covariance parameter and the regularization parameter may be derived based on the following equation.

$$R_{matrix} = HH^H + R_{nn} \qquad \text{Equation 2}$$

Here, $R_{matrix}$ denotes a covariance matrix for interference/noise, H denotes a channel matrix, and $R_{nn}$ denotes a regularization parameter. For example, when $R_{nn}$ of "regularizationFactor" is 0, this may represent zero forcing (ZF) beamforming (BF).

Hereinafter, the disclosure describes a device and method of a DU/RU, signaling, and a message for efficient processing of the above-described regularization parameter ("regularizationFactor"). In the disclosure, a regularization parameter may be referred to and described as a regularization factor, regularization information, a regularization element, and the like. The embodiments are described using an example in which a regularization parameter is a 2-byte value of "regularizationFactor" of section type 6. However, in relation to a scheme for the size/calculation of data, transformation of the scheme into a form, which is easy for a person skilled in the art, and execution thereof may also be understood as an embodiment of the disclosure.

Figure 5B:
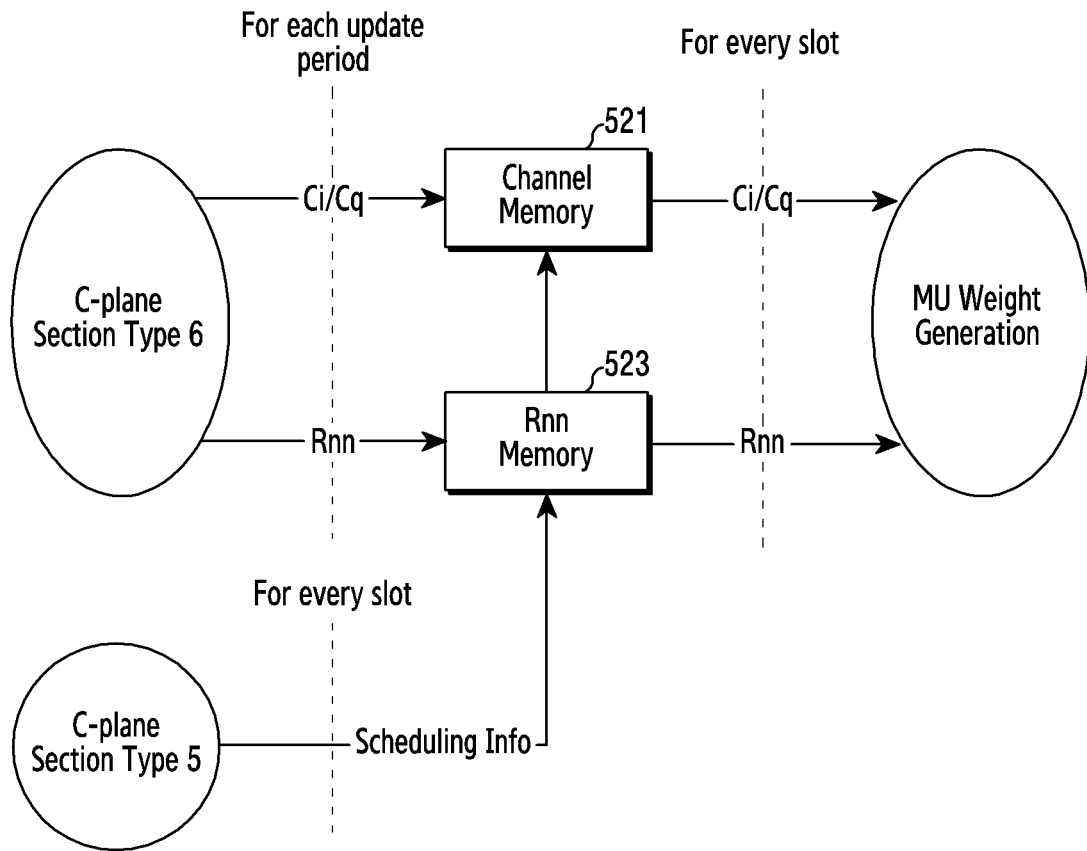
FIG. 5B illustrates an example of a functional configuration of an RU for beamforming information processing according to an embodiment of the disclosure.

FIG. 5B illustrates an example of a functional configuration of an RU for beamforming information processing according to an embodiment of the disclosure. An RU may include a channel memory 521 and a regularization factor memory 523.

Referring to FIG. 5B, the channel memory 521 may acquire channel information from a control message of section type 6. The RU may store the channel information in the channel memory 521. The channel information may be periodically updated. For example, the channel information may be "ciIsample (Ci)" or "ciQsample (Cq)" of section type 6, or may include a value obtained therefrom. Ci denotes an I value of complex channel information, and Cq denotes a Q value of the complex channel information. The regularization factor memory 523 may obtain information on a regularization parameter from the control message of section type 6. The regularization parameter is also transferred (updated) when the channel information is transferred (updated) in C-plane section type 6. The RU may store information on the regularization parameter in the regularization factor memory 523. In this case, the information on the regularization parameter may be periodically updated. For example, the information on the regularization parameter may be "regularization factor" of section type 6, or may include a value obtained therefrom. The regularization factor memory 523 may be referred to as an $R_{nn}$ memory (e.g., $R_{nn}$ is a regularization parameter value of Equation 2).

A control message of section type 5 may include scheduling information of a UE. Scheduling may be performed in a specified unit (e.g., slot unit). The scheduling information may be repeatedly provided to the regularization factor memory 523 for each slot. Information on the regularization parameter is transferred along with the channel information, and the RU may thus include the regularization factor memory 523 of the same level as the channel memory 521 which is a memory storing the channel information. The RU may acquire a corresponding channel value and regularization parameter value from each memory so as to calculate a beamforming weight, according to scheduling information (e.g., the control message of section type 5) transferred for each slot. Specifically, in order to calculate the beamforming weight, the RU may acquire the channel information from the channel memory 521 and may acquire the regularization parameter from the regularization factor memory 523. The RU may calculate and acquire a beamforming weight (or multi-user (MU) weight) for MMSE (or ZFBF) for a current channel, based on the regularization parameter and the channel information.

Although the beamforming weight needs to be calculated only when the UE is scheduled, the regularization factor memory 523 periodically acquires and stores channel information and a regularization parameter in addition to the scheduling information acquired each time when the UE is scheduled. When the UE is actually scheduled, a most recently transferred regularization parameter value should be used, and therefore the regularization factor memory 523 is required to store all transferred regularization parameter values even if the values are not actually used. Therefore, information on the regularization parameter, which is repeatedly stored even though the UE is not actually scheduled, causes a burden on the regularization factor memory 523. In addition, if the channel information is updated for a relatively long period compared to the scheduling information updated in every slot (e.g., 0.5 ms), a probability that the regularization parameter of section type 6 does not correctly reflect a channel actually experienced by the UE increases. A specific example is described via FIG. 5C.

Figure 5C:
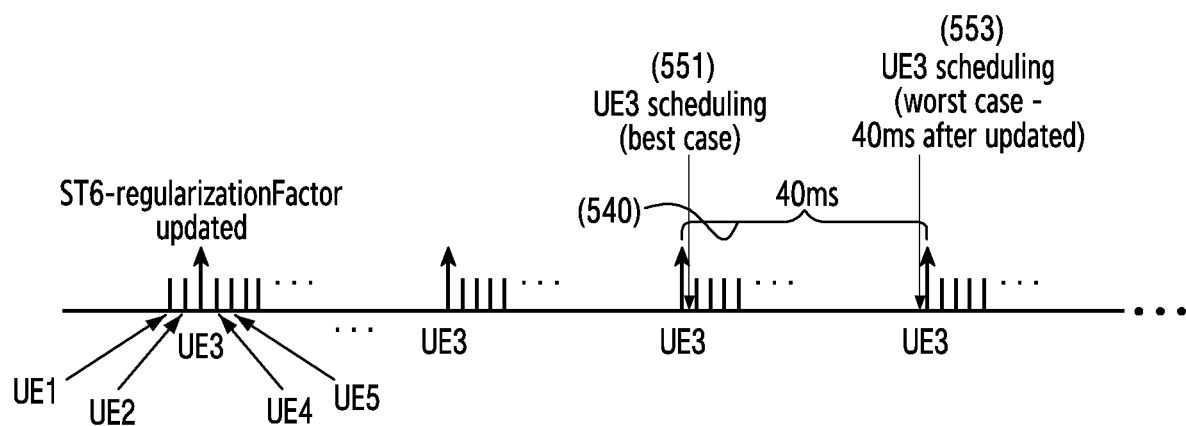
FIG. 5C illustrates a relationship between a regularization factor and scheduling according to an embodiment of the disclosure.

FIG. 5C illustrates a relationship between a regularization factor and scheduling according to an embodiment of the disclosure.

Referring to FIG. 5C, upward-pointing arrows indicate that a "regularization factor" of a control message of section type 6 for UE #3 is transferred. A transfer period 540 of the control message may be 40 ms. Multiple UEs may be scheduled. UE #3 may be scheduled at each of a front end 551 and a rear end 553 within a period 540 of 40 ms.

If UE #3 is scheduled in the front end 551, since a relatively small amount of time has elapsed after channel information of section type 6 is updated, an RU may derive a beamforming weight that is more consistent with an actual channel. However, if UE #3 is scheduled at the rear end 553, since a relatively long time has elapsed after channel information of section type 6 is updated, it is difficult for the RU to derive a beamforming weight that is more consistent with an actual channel. This is because a channel changes over time, so that a difference occurs between an actual channel and a channel appearing in channel information transferred via a DU. Such a problem causes a larger error when a transfer period of the control message of section type 6 is longer, and this error causes an incorrect beamforming weight to be generated, resulting in a decrease in transmission performance.

Hereinafter, various embodiments describe a method for transferring a regularization parameter along with transferring of scheduling information, instead of periodically transferring a regularization parameter, in order to resolve the problems described via FIG. 5A to FIG. 5C. Various embodiments describe a processing method of "regularizationFactor", which is periodically transferred, of section type 6 defined in the existing O-RAN standard, in order to satisfy backward compatibility. Various embodiments describe a method of new functional implementation of an RU, in order to avoid a memory burden in storing periodically transferred information.

In the disclosure, not only transferring of scheduling/channel information for a 5G communication system (e.g., NR) but also implementation for a 4G communication system (e.g., LTE) may be understood as an embodiment of the disclosure. That is, the communication system, in which DU and RU operations described later are provided, is neither limited only to the 5G communication system nor limited only to the 4G communication system.

FIG. 6 illustrates an example of an extension field according to an embodiment of the disclosure. When a control message according to an existing section type is transmitted, a DU may transmit additional information along with the control message via an extension field. That is, the DU may transmit the control message on a control plane section by attaching a new extension field, a "section extension" field.

Referring to FIG. 6, a section extension field 600 according to various embodiments may include information on a regularization parameter. The regularization parameter may be a value corresponding to "regularizationFactor" of section type 6.

extType may indicate a type for an additional parameter. According to an embodiment, if extType indicates 11, extType may indicate that an additional parameter includes a value of a regularization factor for MMSE (or ZFBF). A value of "11" is exemplary and, of course, another number for designating the type for the parameter may be assigned.

ef may indicate whether an additional section extension field exists. An ef value of "1" indicates that there is an additional section extension field, and an ef value of "0" indicates that there is no additional section extension field.

extLen may indicate a length of a section extension field in units of 4 bytes. According to an embodiment, extLen may indicate 1.

A section extension field including a regularization parameter according to various embodiments may be attached to a control message (e.g., a control plane message of section type 5 of O-RAN) including scheduling information so as to be transmitted along with the control message. A problem of being incapable of reflecting an actual channel state when calculating a beamforming weight, due to the difference between a scheduling time and a transfer time of a regularization parameter may be resolved by transferring the regularization parameter along with scheduling information by the DU.

Although not illustrated in FIG. 6, a section extension field including channel information may be defined. For example, a section extension field including channel information (e.g., ciIsample and ciQsample) within a control message of section type 6 may be defined. The channel information in the section extension field may be configured for each frequency resource (e.g., a PRB, a PRB group, a bandwidth part (BWP), etc.) for each antenna. By considering capability of a terminal that an RU intends to serve and/or rank information of the terminal, the DU may acquire the number of required antennas among all antennas. When a relatively small amount of channel information is required according to a type of communication scheme (e.g., LTE), or by considering a scheduling area for a specific terminal, the DU may identify a frequency domain which is actually serviced to the terminal from among resources of the entire frequency domain.

In some embodiments, the channel information may include channel information for each of all antennas and channel information for each of all PRBs. In some other embodiments, the channel information may include channel information for each of some antennas among all antennas and channel information for each of some PRBs among all PRBs. In some other embodiments, the channel information may include channel information for each of some antennas among all antennas and channel information for each of all PRBs. In some other embodiments, the channel information may include channel information for each of all antennas and channel information for each of some PRBs. According to an embodiment, by transferring channel information for an actual scheduling area of the terminal, channel information having a relatively small capacity may be configured as a section extension field.

Instead of being periodically transferred as in section type 6, channel information may be attached to section type 5, via which scheduling information is transmitted, so as to be transferred to the RU in the form of a section extension field. Like a regularization parameter, by providing channel information during actual scheduling of the terminal, a problem of deterioration of communication performance due to the difference between a channel information transferring time and an actual scheduling time may be solved. In addition, if accurate channel information is irregularly required as necessary, the RU may obtain an optimal beamforming weight via a section extension field.

According to an embodiment, a section extension field including channel information may be configured as shown in the following table. The section extension field including channel information may be attached to a control message (e.g., a control message of section type 5 of the C-plane) including scheduling information of a terminal (UE) so as to be transmitted.

TABLE 1

| 0 | 1 | 2 | 3 | 4 | 5 | 6 | 7 | | |
|---|---|---|---|---|---|---|---|---|---|
| ef | | | extType = 0x12 | | | | | 1 | Octet N |
| | | | extLen = 0x02 | | | | | 1 | Octet N + 1 |
| | | | ciIsample (first PRB, first antenna) | | | | | 2 | Octet N + 2 |
| | | | | | | | | | Octet N + 3 |
| | | | ciQsample (first PRB, first antenna) | | | | | 2 | Octet N + 4 |
| | | | | | | | | | Octet N + 5 |
| | | | reserved | | | | | 1 | Octet N + 6 |
| | | | reserved | | | | | 1 | Octet N + 7 |

According to an embodiment, a section extension field including channel information may be configured as shown in the following table. The section extension field including channel information may include information on "regularizationFactor", that is, a regularization parameter. The section extension field including both channel information and regularization parameter information may be attached to a control message (e.g., a control message of section type 5 of the C-plane) including scheduling information of a terminal (UE) so as to be transmitted.

TABLE 2

| 0 | 1 | 2 | 3 | 4 | 5 | 6 | 7 | | |
|---|---|---|---|---|---|---|---|---|---|
| ef | | | extType = 0x13 | | | | | 1 | Octet N |
| | | | extLen = 0x02 | | | | | 1 | Octet N + 1 |
| | | | regularizationFactor | | | | | 2 | Octet N + 2 |
| | | | | | | | | | Octet N + 3 |
| | | | ciIsample (first PRB, first antenna) | | | | | 2 | Octet N + 4 |
| | | | | | | | | | Octet N + 5 |
| | | | ciQsample (first PRB, first antenna) | | | | | 2 | Octet N + 6 |
| | | | | | | | | | Octet N + 7 |

In Tables 1 and 2, ciIsample and ciQsample for one antenna/one PRB are illustrated for the channel information, but various embodiments are not limited thereto. The section extension field may be defined for a larger number of antennas or a larger number of PRBs. For example, the lengths of ciIsample and ciQsample may be variable and may be configured by M-plane.

Even if a regularization parameter is transferred along with scheduling information via the section extension field, the regularization parameter transferred via a control message of section type 6 of the existing standard (e.g., O-RAN 2.00) is periodically transferred to the RU. A memory of the RU periodically receives regularization parameters, and therefore the control message of section type 6 is still a burden. Hereinafter, various embodiments propose a method for reducing the influence of "regularizationFactor" of the control message of section type 6 while satisfying backward compatibility with the existing standard.

FIG. 7 illustrates an example of a management message for section type 6 according to an embodiment of the disclosure. A management message refers to a message transferred in a management plane (M-plane) of O-RAN. The DU may perform packet communication with an RU in a management area within a main card. The management message may be transmitted from the DU to the RU or from the RU to the DU. In the management plane, "start up" installation, software management, configuration management, performance management, fault management, and file management may be performed.

Referring to FIG. 7, the DU may generate a management message. A management message according to various embodiments may be a message for configuration to the RU so that "regularization factor" of a control message of section type 6 is invalid. In some embodiments, the management message may include a parameter (hereinafter, a selection parameter) indicating selection of a transfer medium. The selection parameter may indicate whether to transfer a regularization parameter via a message of section type 6 of the control plane or to transfer the regularization parameter via a section extension field as before. For example, a selection parameter value of "0" may indicate transferring of the regularization parameter via the message of section type 6. A selection parameter value of "1" may indicate transferring of the regularization parameter via the section extension field. If the selection parameter value indicates transferring of the regularization parameter via the section extension field, a regularizationFactor value in the control message of section type 6 is invalid. The RU having received the management message including the selection parameter value may not consider the regularizationFactor value of section type 6. For example, the RU may ignore or discard the regularizationFactor value of section type 6 that is periodically transmitted. For example, the RU may not consider the regularizationFactor value for a specified period.

The DU may transmit the management message to the RU. The RU may identify a method of obtaining the regularization parameter from the management message. For example, the RU may obtain a regularization parameter from the section extension field. For another example, the RU may obtain the regularization parameter from section type 6.

Although not illustrated in FIG. 7, fields in the existing section type 6 may be used for backward compatibility. In some embodiments, if "regularizationFactor" indicates a specific value (e.g., 1111 1111 1111 1111), a field value of "regularizationFactor" may be an invalid value. The RU may ignore or discard the corresponding "regularizationFactor" without storing the same. In some other embodiments, if at least one bit in a reserved bit among fields in the existing section type 6 indicates a specific value (e.g., 1), a field value of "regularizationFactor" may be an invalid value. The RU may ignore or discard the corresponding "regularizationFactor" without storing the same. In still some other embodiments, it may be indicated that a field value of "regularizationFactor" is an invalid value, via a combination of at least two of fields in the existing section type 6.

According to various embodiments, in a situation where it is difficult to transmit a message (e.g., the control message of section type 6) for periodic transferring of channel information (e.g., or if the amount of memory allocation of the RU becomes bulky, or the capacity of the RU is insufficient), or in a case where a transmission capacity of a fronthaul is sufficiently large, the DU may transfer additional information along with scheduling information via the section extension field. The additional information may include information replacing information in the control message of section type 6. For example, the additional information may include channel information. For example, the additional information may include information on the regularization parameter. Via transmission of the additional information via the section extension field, the DU may perform replacement of section type 6 via a control message of section type 5.

Figure 8A:
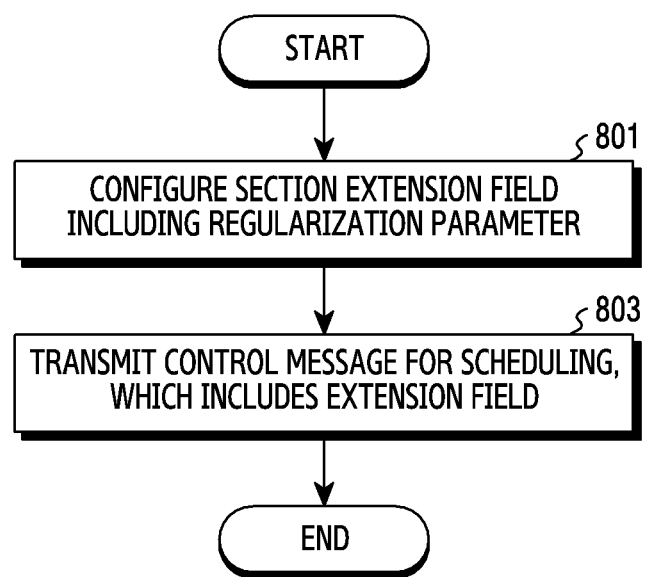
FIG. 8A illustrates an operation flow of a DU for an extension field according to an embodiment of the disclosure.

FIG. 8A illustrates an operation flow of a DU for an extension field according to an embodiment of the disclosure. A DU illustrates the DU 160 of FIG. 2.

Referring to FIG. 8A, in operation 801, the DU may configure a section extension field including a regularization parameter. The regularization parameter may be a parameter for deriving a beamforming weight. The beamforming weight may be a matrix configured so that a valid channel matrix experienced by a transmitted signal is able to smoothly reach a reception end. According to an embodiment, the beamforming weight may be derived based on MMSE or zero-forcing beamforming (ZFBF). For example, the beamforming weight may be derived by Equation 1 described above. This regularization parameter may be a value indicated by a "regularization factor" field within a control message of section type 6 of the O-RAN standard.

In operation 803, the DU may transmit a control message for scheduling, which includes the section extension field, to an RU. The DU may configure the control message for scheduling. That is, the DU may generate a message including scheduling information of a UE, in a control message of a C-plane. For example, the DU may generate a control message of section type 5. The DU may attach an extension section field to the control message. Here, the extension section field may be a section extension field configured in operation 801. The DU may transmit the control message to the RU via a fronthaul interface. That is, via the control message for scheduling, scheduling information for a terminal and a regularization parameter for a channel may be transferred together to the RU.

Figure 8B:
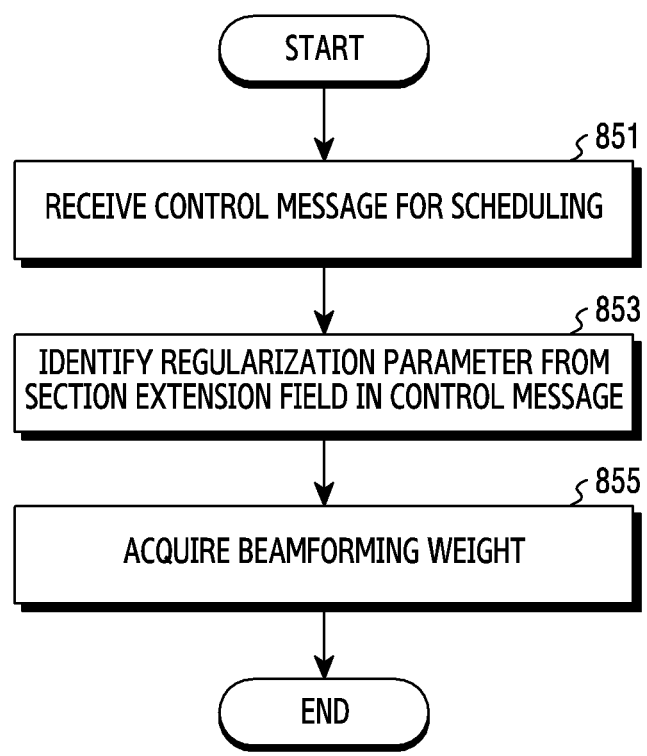
FIG. 8B illustrates an operation flow of an RU for an extension field according to an embodiment of the disclosure.

FIG. 8B illustrates an operation flow of an RU for an extension field according to an embodiment of the disclosure. An RU illustrates the RU 180 of FIG. 2.

Referring to FIG. 8B, in operation 851, the RU may receive a control message for scheduling. The control message may include scheduling information for a UE. For example, the control message may correspond to a message of section type 5 of a C-plane of O-RAN. The RU may receive the control message from a DU via a fronthaul interface.

In operation 853, the RU may identify the regularization parameter from a section extension field in the control message. The RU may identify the section extension field in the control message. The RU may determine what information is included in the section extension field, from type information (e.g., extType) of the section extension field. The RU may determine that the section extension field includes the regularization parameter, from a specified type value. The RU may identify the regularization parameter. For example, the regularization parameter may be indicated with a 2-byte value.

In operation 855, the RU may obtain a beamforming weight. The beamforming weight may be a beamforming weight for multi-users (MU). The RU may derive the beamforming weight based on the regularization parameter obtained in operation 853. For example, the RU may derive the beamforming weight based on Equation 1. For example, the RU may derive the beamforming weight from an $R_{nn}$ value based on Equation 2.

Although not illustrated in FIG. 8A and FIG. 8B, channel information in the control message for scheduling may be additionally included. Here, the channel information may be I/Q data for complex channel information in a resource (e.g., x PRB, where x is an integer smaller than or equal to 273) allocated to a terminal/an antenna of the terminal.

FIGS. 8A and 8B describe a method for reducing an error due to an acquisition time difference of channel information and improving transmission performance, by transmitting the regularization parameter included in existing section type 6 via adding the extension field to the control message including the channel information. However, if the regularization parameter of section type 6 is transmitted via the extension section field without separate processing of the regularization parameter, there occurs a problem that a work capacity in a memory of the RU becomes too bulky. Specifically, section type 6 is transmitted periodically, while scheduling is performed in units much shorter than the above period, so that, in order to calculate the beamforming weight by reflecting real-time channel information, there occurs a problem of storing information (e.g., the channel information and the regularization parameter) relating to a channel for each scheduling unit during the period. Accordingly, a method for deactivating (or invalidating) the regularization parameter of the control message of existing section type 6, which is periodically transferred, is described.

Figure 9A:
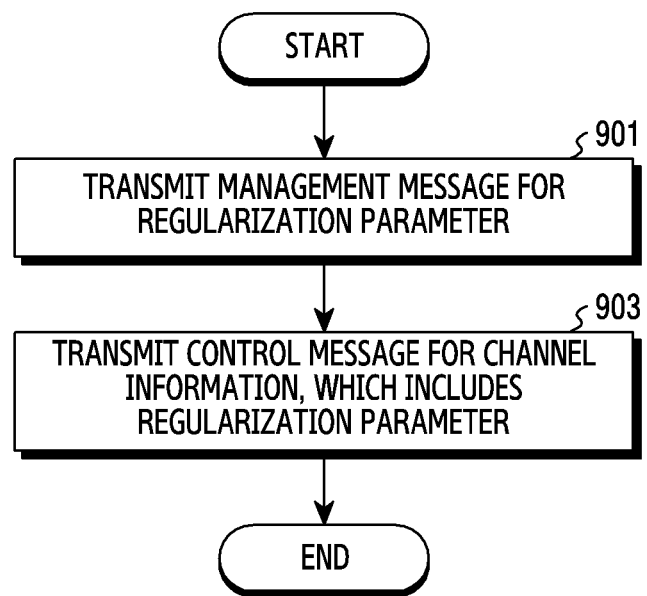
FIG. 9A illustrates an operation flow of a DU for a management message for section type 6 according to an embodiment of the disclosure.

FIG. 9A illustrates an operation flow of a DU for a management message for section type 6 according to an embodiment of the disclosure. A DU illustrates the DU 160 of FIG. 2.

Referring to FIG. 9A, in operation 901, the DU may transmit a management message for a regularization parameter. The DU may transmit the management message to an RU via a fronthaul interface. The management message may be a message transferred from the DU to the RU on an M-plane. The management message is a non-real time message and may be transmitted in a main card of the DU. The management message for the regularization parameter may be a message indicating a method for acquiring the regularization parameter by the RU. In some embodiments, the management message may indicate whether the regularization parameter is transferred via a section extension field or transferred via a control message for channel information. For example, the management message may include 1 bit. The 1 bit may indicate a transfer scheme of a regularization parameter. For example, "1", i.e., the value of 1 bit, may indicate that the regularization parameter is transferred via the section extension field. "0", i.e., the value of 1 bit, may indicate that the regularization parameter is transferred via a control message of section type 6 (C-plane).

In some embodiments, the management message may include information relating to validity of the regularization parameter of the control message for channel information. For example, the management message may indicate, with 1 bit, whether "regularizationFactor" in the control message of section type 6 is valid. A value of "1" may indicate that the regularization parameter in section type 6 is invalid. The value of "1" may implicitly indicate that the regularization parameter is transferred via the section extension field. The value of "0" may indicate that the regularization parameter in section type 6 is valid.

In some embodiments, the management message may include information relating to the validity of the regularization parameter of the extension section field. For example, the management message may indicate, with 1 bit, whether "regularizationFactor" in the section extension field is valid. The value of "1" may indicate that the regularization parameter in the section extension field is invalid. The value of "1" may implicitly indicate that the regularization parameter is transferred via section type 6. The value of "0" may indicate that the regularization parameter in the section extension field is valid. For example, the management message may include information on a validity period of the regularization parameter of the extension section field. The regularization parameter of the control message of section type 6 may be configured to default, and the regularization parameter of the extension section field may be provided to the RU as needed. In this case, during the validity period according to the management message, only the regularization parameter of the extension section field may be received, and the regularization parameter of the control message of section type 6 may be ignored or discarded.

In operation 903, the DU may transmit the control message for the channel information, which includes the regularization parameter. The DU may transmit the control message to the RU via the fronthaul interface. The control message may be configured to include the channel information, and may be periodically transferred from the DU to the RU. For example, the control message may be a message of section type 6 of O-RAN, and the regularization parameter may be "regularizationFactor".

The DU may configure whether the regularization parameter for a channel is valid, to the RU via the management message, so that even if the DU transmits the management message as in the existing standard, the RU may efficiently process the regularization parameter. That is, backward compatibility may be satisfied.

Figure 9B:
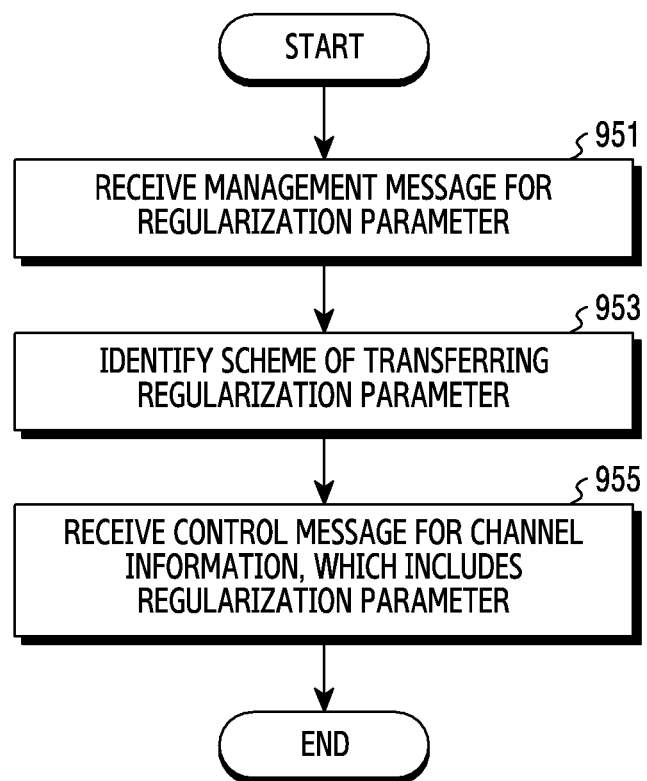
FIG. 9B illustrates an operation flow of an RU for a management message for section type 6 according to an embodiment of the disclosure.

FIG. 9B illustrates an operation flow of an RU for a management message for section type 6 according to an embodiment of the disclosure. An RU illustrates the RU 180 of FIG. 2.

Referring to FIG. 9B, in operation 951, the RU may receive a management message for a regularization parameter. The RU may receive the management message from a DU via a fronthaul interface. The management message is a message transferred in an M-plane and may be transferred in a main card of the DU. The management message for the regularization parameter may include information on a scheme of transferring the regularization parameter. In some embodiments, the management message may indicate whether the regularization parameter is transferred via a section extension field or transferred via a control message for channel information. In some embodiments, the management message may include information relating to the validity of a regularization parameter of section type 6. In some embodiments, the management message may include information on the validity of the regularization parameter transferred via the section extension field.

In operation 953, the RU may identify a transfer scheme of the regularization parameter. The RU may identify a transfer scheme of the regularization parameter, based on the management message received from the DU. For example, the RU may acquire the regularization parameter only via the control message (e.g., the control message of section type 6) for the channel information. For example, the RU may acquire the regularization parameter only via the section extension field. For example, the RU may acquire the regularization parameter via at least one of the section extension field or the control message for the channel information.

In operation 955, the RU may receive the control message for the channel information, which includes the regularization parameter. The RU may receive the control message from the DU via the fronthaul interface. The RU may determine whether acquisition of the regularization parameter is allowed via the control message for the channel information. If acquisition of the regularization parameter via the control message for the channel information is allowed, the RU may acquire the regularization parameter from the control message (e.g., the control message of section type 6). The RU may determine a beamforming weight based on the acquired regularization parameter.

If acquisition of the regularization parameter via the control message for the channel information is not allowed, the RU may ignore or discard the regularization parameter of the control message (e.g., the control message of section type 6) for the channel information. According to an embodiment, if scheduling information is received, the RU may acquire the regularization parameter from an extension field in the control message including the scheduling information. The RU may determine the beamforming weight based on the acquired regularization parameter.

Although not illustrated in FIGS. 9A and 9B, a control message in addition to the management message may be used to indicate a scheme of transferring a regularization parameter. The management message may be transferred in a main card of the DU to the RU, and the control message may be transferred from a channel card of the DU to the RU. The control message may be transmitted in real time relative to the management message. According to an embodiment, it may be indicated that "regularizationFactor" in the control message of section type 6 is invalid, via a partial value of "regularizationFactor" or a partial field of the control message.

Figure 10:
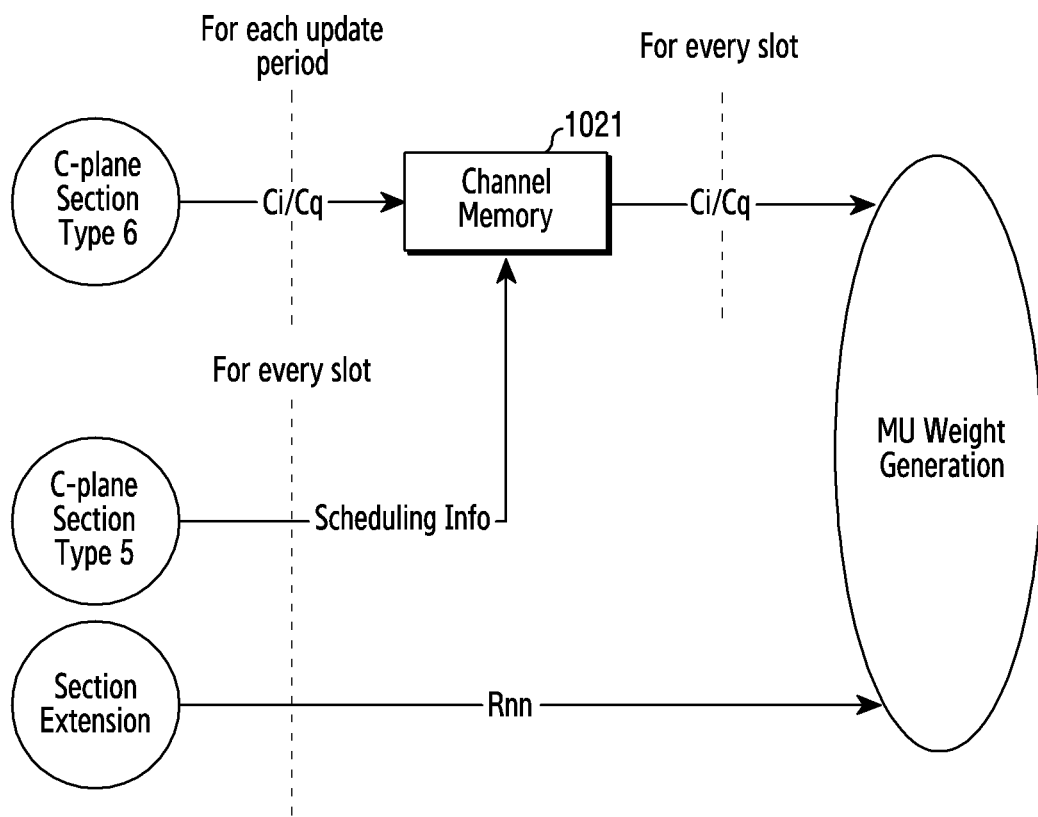
FIG. 10 illustrates an example of a functional configuration of an RU for beamforming information processing according to an embodiment of the disclosure.

FIG. 10 illustrates an example of a functional configuration of an RU for beamforming information processing according to an embodiment of the disclosure. An RU may include a channel memory 1021.

Referring to FIG. 10, the channel memory 1021 may acquire channel information from a control message of section type 6. The RU may store the channel information in the channel memory 1021. The channel information may be periodically updated. For example, the channel information may be "ciIsample (Ci)" or "ciQsample (Cq)" of section type 6, or may include a value obtained therefrom. Ci denotes an I value of complex channel information, and Cq denotes a Q value of the complex channel information. The RU may ignore or discard information on a regularization parameter in the control message of section type 6. The RU may identify that the regularization parameter in the control message of section type 6 is invalid. According to an embodiment, the RU may identify that the regularization parameter in the control message of a control plane of section type 6 is invalid, based on a management message of a management plane from a DU. According to an embodiment, the RU may identify that the regularization parameter in the control message of section type 6 is invalid, based on a control message of the DU.

The RU may transfer scheduling information of section type 5 to a channel memory 1021. The channel memory 1021 may store scheduling information in units of slots (scheduling unit), and may use a channel information result according thereto when a beamforming weight is calculated. The channel memory 1021 may output channel information in units of slots, and an output result may be used when a beamforming weight is calculated.

The RU may acquire a regularization parameter from a section extension field transferred along with section type 5. Unlike the description in FIG. 5B, the RU according to various embodiments may not include a regularization factor memory. That is, the RU may be configured not to store a regularizationFactor value of the control message of section type 6, which is periodically transferred. Due to causing of a memory burden, the RU may be configured to acquire only the regularization parameter of the section extension field. Therefore, the RU acquires the regularization parameter via the section extension field in a control message including scheduling information, that is, the control message of section type 5, so that the acquired regularization parameter may be used directly to calculate the beamforming weight. This is because a terminal is scheduled in a corresponding slot, and it is thus expected to determine a beamforming weight directly.

By transferring the regularization parameter value (i.e., $R_{nn}$ value) via the section extension field, the regularization parameter may be directly transferred to a beamforming weight calculator without a separate memory (e.g., the regularization factor memory 523 in FIG. 5B) for storing the regularization parameter. Since the regularization parameter transferred via the extension field corresponds to a channel actually used, accuracy thereof is improved compared to the regularization parameter transferred via existing section type 6. An update time of the regularization parameter and a use time of the regularization parameter are almost the same, and therefore a decrease in transmission performance due to a channel error may be reduced. In addition, a separate memory for storing the regularization parameter of section type 6 is not required, and therefore implementation of the RU may be more simplified.

Although not illustrated in FIG. 10, a DU or the RU may further include a multiplexer (MUX). The MUX may configure, as an input, the regularization parameter of the extended field in the control message of section type 5 and the regularization parameter in the control message of section type 6. The MUX may select an output based on a message of an M-plane. If the message of the M-plane allows transfer of the regularization parameter by the section extension field, the MUX may output the regularization parameter of the control message of section type 5. The RU may calculate a beamforming weight based on the output regularization parameter. If the message of the M-plane does not allow transfer of the regularization parameter by the section extension field, the MUX may output the regularization parameter of the control message of section type 6. The RU may calculate a beamforming weight based on the corresponding regularization parameter. A central processing unit (CPU) of the DU that generates a message in the control plane may also provide one output to the RU via the MUX.

Figure 11:
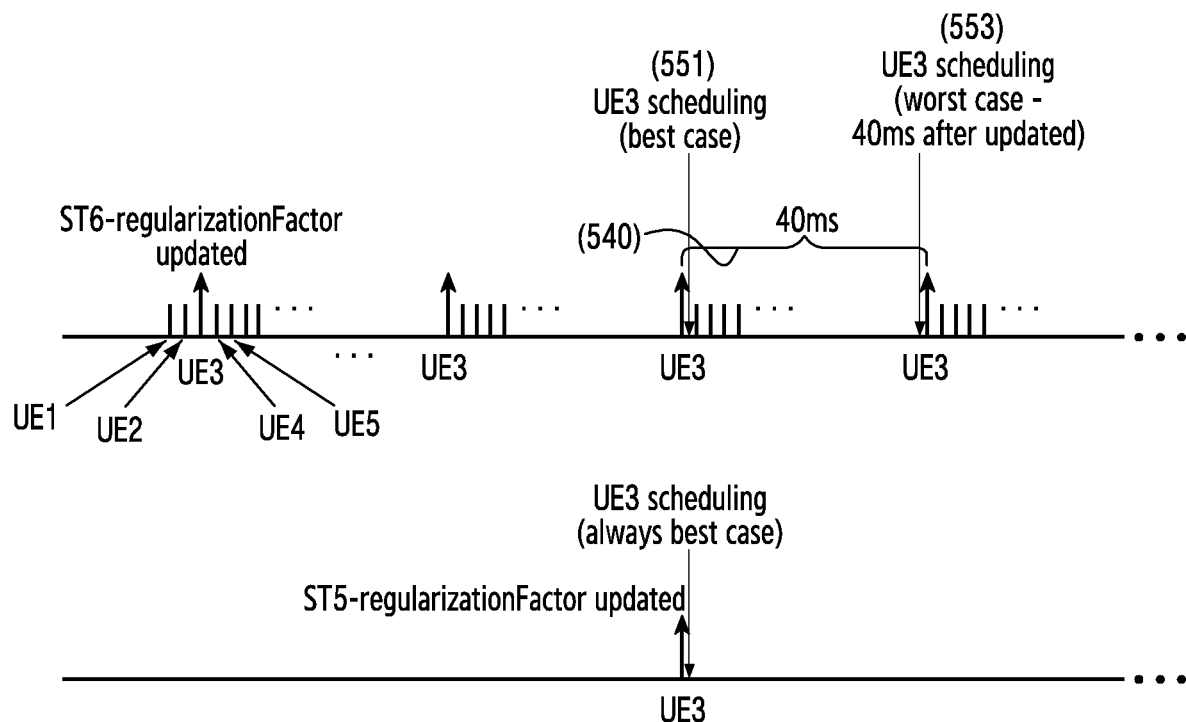
FIG. 11 illustrates a relationship between a regularization factor and scheduling according to an embodiment of the disclosure.

FIG. 11 illustrates a relationship between a regularization factor and scheduling according to an embodiment of the disclosure.

Referring to FIG. 11, upward-pointing arrows indicate that a "regularization factor" of a control message of section type 5 for UE #3 is transferred. Unlike illustrated in FIG. 5C, a valid "regularization factor" may be transferred according to a scheduling time of UE #3, instead of being transferred periodically. The regularization factor is updated immediately before UE #3 is scheduled, and therefore an RU may derive a beamforming weight more consistent with an actual channel. Accordingly, as shown in FIG. 5C, regardless of whether the RU is located at the front end 551 or the rear end 553 within a scheduling period, the RU may acquire an optimal beamforming weight.

Although not illustrated in FIG. 11, according to an embodiment, channel information may be transferred along with a regularization parameter via section type 5. By transfer of not only the regularization parameter but also actual channel state information (per antenna, per PRB) with the regularization parameter, the RU may acquire a beamforming weight more consistent with the actual channel.

Figure 12:
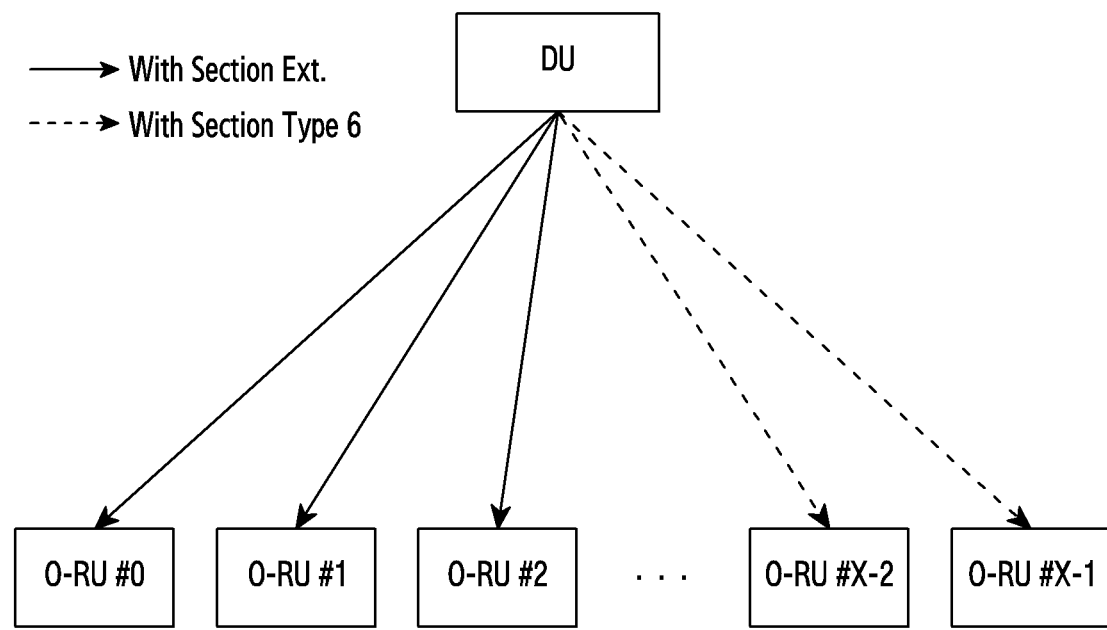
FIG. 12 illustrates an example of a relationship between DUs and RUs via a section extension field according to an embodiment of the disclosure.

FIG. 12 illustrates an example of a relationship between DUs and RUs via a section extension field according to an embodiment of the disclosure. A section extension field according to various embodiments may be configured to replace a control message of section type 6. In some embodiments, the section extension field may include information on a regularization parameter. In some embodiments, the section extension field may include channel information.

Referring to FIG. 12, a DU may be connected to a plurality of RUs. An RU conforms to the O-RAN standard, and may be thus referred to as an O-RU. The DU may be connected to an X number of O-RUs. The DU may be connected to O-RU #0, O-RU #1, O-RU #2, . . . , to O-RU #X–1. According to an embodiment, some of the O-RUs may periodically acquire channel information via section type 6. On the other hand, some other O-RUs may acquire channel information via the section extension field according to various embodiments. The transfer scheme (e.g., a scheme of transferring a regularization parameter) for each O-RU, that is, whether the transfer is performed via section type 6 or via the section extension field, may be determined based on a management plane parameter (M-plane parameter) according to an embodiment. Via the M-plane parameter, whether to transfer channel-related information (e.g., regularization parameter) via section type 6 or to transfer channel-related information via a section extension field including optional additional information may be selected. The DU may configure this to each RU via the M-plane parameter.

According to embodiments, an operation method of a digital unit (DU) of a base station in a wireless communication system, the method comprises: configuring a section extension field comprising additional information; and transmitting a first control message comprising the section extension field to a radio unit (RU) via a fronthaul interface, wherein the first control message is configured to schedule a terminal in a control plane.

In some embodiments, the first control message corresponds to a control message of section type 5 of an open-radio access network (O-RAN), and the first control message comprises scheduling information on the terminal.

In some embodiments, the method further comprises: transmitting a management message related to the section extension field, wherein the management message is configured in a management plane.

In some embodiments, the additional information comprises a regularization parameter.

In some embodiments, the method further comprises: configuring the section extension field so as to comprise the regularization parameter; and transmitting the first control message comprising the section extension field that comprises the regularization parameter, wherein the first control message comprising the section extension field that comprises the regularization parameter is configured to schedule the terminal in the control plane.

In some embodiments, the method further comprises: transmitting a management message related to the regularization parameter; and transmitting a second control message comprising the regularization parameter to the RU, wherein the second control message is configured to periodically transmit channel information in the control plane, and the management message is configured in a management plane.

In some embodiments, the second control message corresponds to a message of section type 6 of an open-radio access network (O-RAN), and the second control message comprises channel information.

In some embodiments, the regularization parameter is used to calculate a beamforming weight for a minimum mean square error (MMSE) operation, and the regularization parameter corresponds to a regularizationFactor field of a message of section type 6 of an open-radio access network (O-RAN).

According to embodiments, an operation method of a radio unit (RU) of a base station in a wireless communication system. The method comprises: receiving a first control message comprising a section extension field from a digital unit (DU) via a fronthaul interface; identifying additional information based on the section extension field; and acquiring a beamforming weight based on the additional information, wherein the first control message is configured to schedule a terminal in a control plane.

In some embodiments, the method further comprises: receiving a management message related to the section extension field, wherein the management message is configured in a management plane.

In some embodiments, the additional information comprises a regularization parameter.

In some embodiments, the first control message corresponds to a control message of section type 5 of an open-radio access network (O-RAN), and the first control message comprises scheduling information on the terminal.

In some embodiments, the method further comprises: receiving a management message related to the regularization parameter, which is configured in a management plane, from the DU; based on the management message, identifying, as a scheme of transferring the regularization parameter, at least one scheme of a scheme via the first control message or a scheme via a second control message configured to periodically transmit channel information in the control plane; receiving the second control message comprising another regularization parameter from the DU; identifying one of the regularization parameter or the other regularization parameter according to the at least one scheme; and acquiring the beamforming weight based on the identified one of the regularization parameter or the other regularization parameter.

In some embodiments, the second control message corresponds to a message of section type 6 of an open-radio access network (O-RAN), and the second control message comprises the channel information.

In some embodiments, the regularization parameter is used to calculate the beamforming weight for a minimum mean square error (MMSE) operation, and the regularization parameter corresponds to a regularizationFactor field of a message of section type 6 of an open-radio access network (O-RAN).

According to embodiments, a device of a digital unit (DU) of a base station in a wireless communication system, the device comprising:

at least one transceiver; and at least one processor coupled to the at least one transceiver, wherein the at least one processor is configured to:

configure a section extension field comprising a regularization parameter; and transmit a first control message comprising the section extension field to a radio unit (RU) via a fronthaul interface, wherein the first control message is configured to schedule a terminal in a control plane.

In some embodiments, additional information comprises the regularization parameter.

In some embodiments, the at least one processor is further configured to: configure the section extension field so as to comprise the regularization parameter; and transmit the first control message comprising the section extension field which comprises the regularization parameter, wherein the first control message comprising the section extension field which comprises the regularization parameter is configured to schedule the terminal in the control plane.

In some embodiments, the first control message corresponds to a control message of section type 5 of an open-radio access network (O-RAN), and the first control message comprises scheduling information on the terminal.

In some embodiments, the at least one processor is further configured to: transmit a management message related to the regularization parameter; and transmit a second control message comprising the regularization parameter to the RU, wherein the second control message is configured to periodically transmit channel information in the control plane, and the management message is configured in a management plane.

In some embodiments, the second control message corresponds to a message of section type 6 of an open-radio access network (O-RAN), and the second control message comprises the channel information.

In some embodiments, the at least one processor is configured to transmit a management message related to the section extension field, and the management message is configured in a management plane.

In some embodiments, the regularization parameter is used to calculate a beamforming weight for a minimum mean square error (MMSE) operation, and the regularization parameter corresponds to a regularizationFactor field of a message of section type 6 of an open-radio access network (O-RAN).

According to embodiments, a device of a radio unit (RU) of a base station in a wireless communication system, the device comprises at least one transceiver; and at least one processor coupled to the at least one transceiver, wherein the at least one processor is configured to: receive a first control message comprising a section extension field from a digital unit (DU) via a fronthaul interface; identify a regularization parameter based on the section extension field; and acquire a beamforming weight based on the regularization parameter, wherein the first control message is configured to schedule a terminal in a control plane.

In some embodiments, additional information comprises the regularization parameter.

In some embodiments, the first control message corresponds to a control message of section type 5 of an open-radio access network (O-RAN), and the first control message comprises scheduling information on the terminal.

In some embodiments, the at least one processor is further configured to receive a management message related to the section extension field, and the management message is configured in a management plane.

In some embodiments, the at least one processor is configured to: receive a management message related to the regularization parameter, which is configured in a management plane, from the DU; based on the management message, identify, as a scheme of transferring the regularization parameter, at least one scheme of a scheme via the first control message or a scheme via a second control message configured to periodically transmit channel information in the control plane; receive the second control message comprising another regularization parameter from the DU; identify one of the regularization parameter or the other regularization parameter according to the at least one scheme; and acquire the beamforming weight based on the identified one of the regularization parameter or the other regularization parameter.

In some embodiments, the second control message corresponds to a message of section type 6 of an open-radio access network (O-RAN), and the second control message comprises the channel information.

In some embodiments, the regularization parameter is used to calculate the beamforming weight for minimum mean square error (MMSE) operation, and the regularization parameter corresponds to a regularizationFactor field of a message of section type 6 of an open-radio access network (O-RAN).

In some embodiments, the beamforming weight is calculated based on channel matrix, the regularization parameter, and a power normalized parameter for limiting full power.

In some embodiments, to calculate the beamforming weight, the at least one processor is further configured to: generate a channel covariance matrix for interference/noise based on a channel matrix and the regularization parameter, and determine a beamforming weight matrix based on the channel covariance matrix.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a distributed unit (DU) of a base station in a wireless communication system, the method comprising:
   generating a control plane message using a section type 5 for user equipment (UE) scheduling information, the control plane message including section extension information; and
   transmitting the control plane message to a radio unit (RU) via a fronthaul interface,
   wherein the section extension information includes information indicating a regularization factor which is used for minimum means square error (MMSE) calculation of generating multi-user (MU) beamforming weight for UEs in a slot.

2. The method of claim 1, wherein the section type 5 is defined in an open-radio access network (O-RAN).

3. The method of claim 1, further comprising:
   transmitting, to the RU, a management plane message for indicating that the regularization factor is transmitted in the section extension information.

4. The method of claim 1, wherein, based on a capability of the RU, the regularization factor is transmitted to the RU from the DU instead of a section type 6 for channel information.

5. The method of claim 1, wherein the regularization factor is associated with a noise variance used for the MMSE calculation.

6. The method of claim 1,
   wherein the section extension information includes:
      information of a type of the section extension information, the type associated with the regularization factor, and
      information of a length of the section extension information, and
   wherein a length of the regularization factor is 16 bits.

7. A method performed by a radio unit (RU) of a base station in a wireless communication system, the method comprising:
   receiving, from a distributed unit (DU) via a fronthaul interface, a control plane message using a section type 5 for user equipment (UE) scheduling information, the control plane message including section extension information;
   identifying information indicating a regularization factor from the section extension information; and
   acquiring a beamforming weight based on the regularization factor,
   wherein the regularization factor is used for minimum means square error (MMSE) calculation of generating multi-user (MU) beamforming weight for UEs in a slot.

8. The method of claim 7, further comprising:
   receiving, from the DU, a management plane message for indicating that the regularization factor is transmitted in the section extension information.

9. The method of claim 7, wherein, based on a capability of the RU, the regularization factor received from the DU instead of a section type 6 for channel information.

10. The method of claim 7, wherein the section type 5 is defined in an open-radio access network (O-RAN).

11. The method of claim 7, wherein the regularization factor is associated with a noise variance used for the MMSE calculation.

12. The method of claim 7,
wherein the section extension information includes:
information of a type of the section extension information, the type associated with the regularization factor, and
information of a length of the section extension information, and
wherein a length of the regularization factor is 16 bits.

13. A device of a distributed unit (DU) of a base station in a wireless communication system, the device comprising:
at least one transceiver; and
at least one processor coupled to the at least one transceiver, wherein the at least one processor is configured to:
generate a control plane message using a section type 5 for user equipment (UE) scheduling information, the control plane message including section extension information, and
control the at least one transceiver to transmit the control plane message to a radio unit (RU) via a fronthaul interface,
wherein the section extension information includes information indicating a regularization factor which is used for minimum means square error (MMSE) calculation of generating multi-user (MU) beamforming weight for UEs in a slot.

14. The device of claim 13, wherein, based on a capability of the RU, the regularization factor is transmitted to the RU from the DU instead of a section type 6 for channel information.

15. The device of claim 13,
wherein the section type 5 is defined in an open-radio access network (O-RAN).

16. The device of claim 13, wherein the at least one processor is further configured to:
transmit, to the RU, a management plane message for indicating that the regularization factor is transmitted in the section extension information.

17. The device of claim 13, wherein the regularization factor is associated with a noise variance used for the MMSE calculation.

18. The device of claim 13,
wherein the section extension information includes:
information of a type of the section extension information, the type associated with the regularization factor, and
information of a length of the section extension information, and
wherein a length of the regularization factor is 16 bits.

* * * * *